United States Patent
Kang et al.

(10) Patent No.: US 8,406,741 B2
(45) Date of Patent: Mar. 26, 2013

(54) DUAL SIM MOBILE TERMINAL AND OPERATING METHOD THEREOF

(75) Inventors: Yunhwan Kang, Seoul (KR); Woohyun Baik, Gyeonggi-Do (KR); Wooyoung Kwak, Gyeonggi-Do (KR); Sungkyu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/376,055

(22) PCT Filed: May 17, 2010

(86) PCT No.: PCT/KR2010/003105
§ 371 (c)(1), (2), (4) Date: Feb. 9, 2012

(87) PCT Pub. No.: WO2010/140781
PCT Pub. Date: Dec. 9, 2010

(65) Prior Publication Data
US 2012/0135715 A1   May 31, 2012

(30) Foreign Application Priority Data
Jun. 5, 2009 (KR) .................. 10-2009-0050116

(51) Int. Cl.
*H04M 1/725* (2006.01)
(52) U.S. Cl. ............... 455/412.1; 455/411; 455/418; 455/558; 455/450

(58) Field of Classification Search .......... 455/411, 455/418
See application file for complete search history.

(56) References Cited

U.S. PATENT DOCUMENTS

| | | | |
|---|---|---|---|
| 6,442,260 B1 * | 8/2002 | Simonen | 379/130 |
| 2002/0154632 A1 * | 10/2002 | Wang et al. | 370/389 |
| 2006/0234693 A1 * | 10/2006 | Isidore et al. | 455/422.1 |
| 2008/0064443 A1 * | 3/2008 | Shin et al. | 455/558 |
| 2008/0167074 A1 * | 7/2008 | Van Steenbergen | 455/558 |
| 2009/0088211 A1 | 4/2009 | Kim | |
| 2009/0203354 A1 * | 8/2009 | Tanabe | 455/411 |
| 2009/0305737 A1 * | 12/2009 | Bae et al. | 455/552.1 |
| 2010/0279698 A1 * | 11/2010 | Wong | 455/450 |

FOREIGN PATENT DOCUMENTS

| | | |
|---|---|---|
| KR | 10-2002-0088471 A | 11/2002 |
| KR | 10-2005-0022641 A | 3/2005 |
| KR | 10-2009-0032678 A | 4/2009 |
| WO | WO 9931868 A1 * | 6/1999 |

* cited by examiner

*Primary Examiner* — Charles Shedrick
(74) *Attorney, Agent, or Firm* — Birch, Stewart, Kolasch & Birch, LLP

(57) ABSTRACT

Disclosed herein is a dual SIM terminal and an operating method thereof for supporting dual standby and single talk using a single baseband. The dual SIM mobile terminal may include a controller which is a single chipset, a dual SIM, and two radio frequency (RF) units, thereby having an effect capable of providing a service at the same level as a dual SIM using two mobile terminals even with one mobile terminal. Furthermore, dual SIM switching is performed according to a state of the network, a pricing system, and a user's setting, thereby providing the user's desired service.

35 Claims, 16 Drawing Sheets

[Fig. 1]
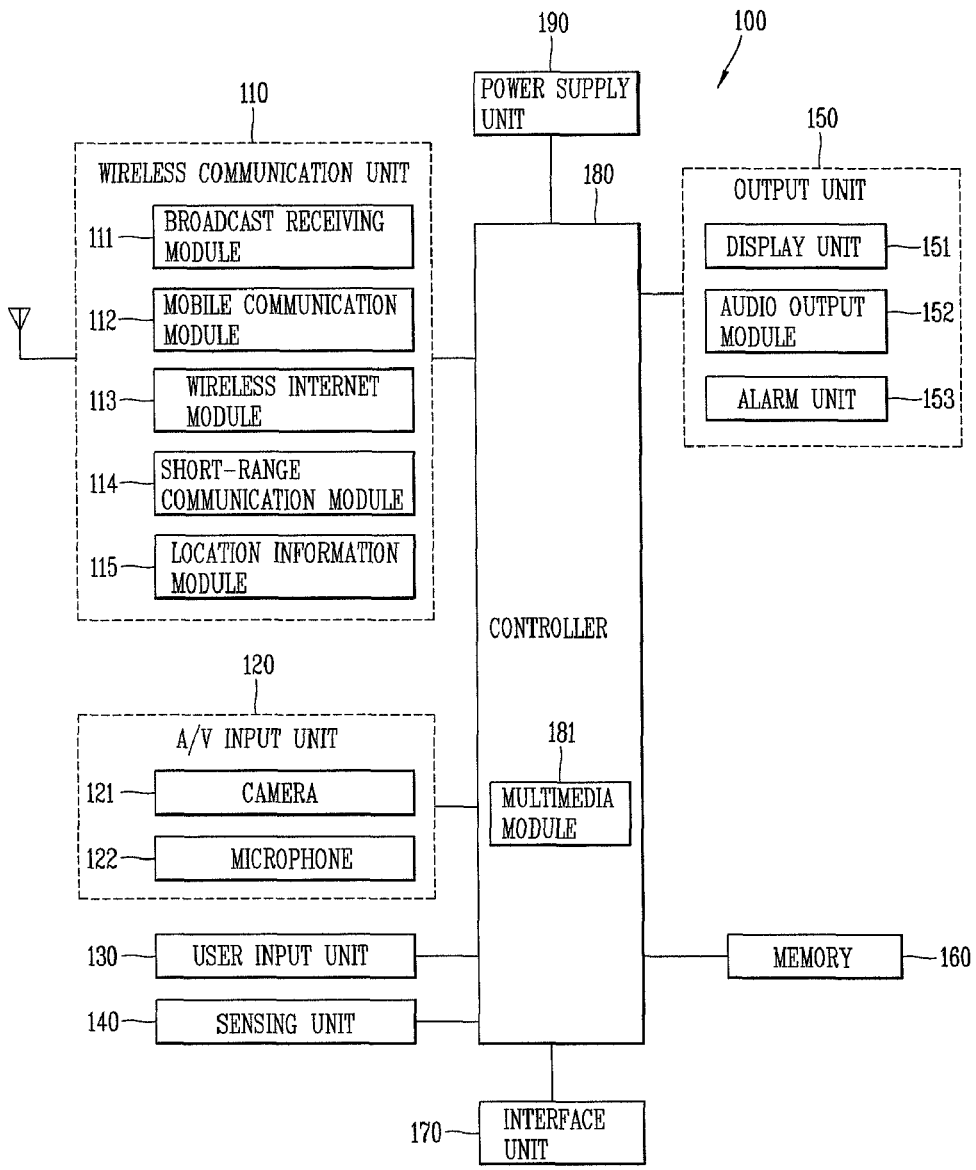

[Fig. 2]
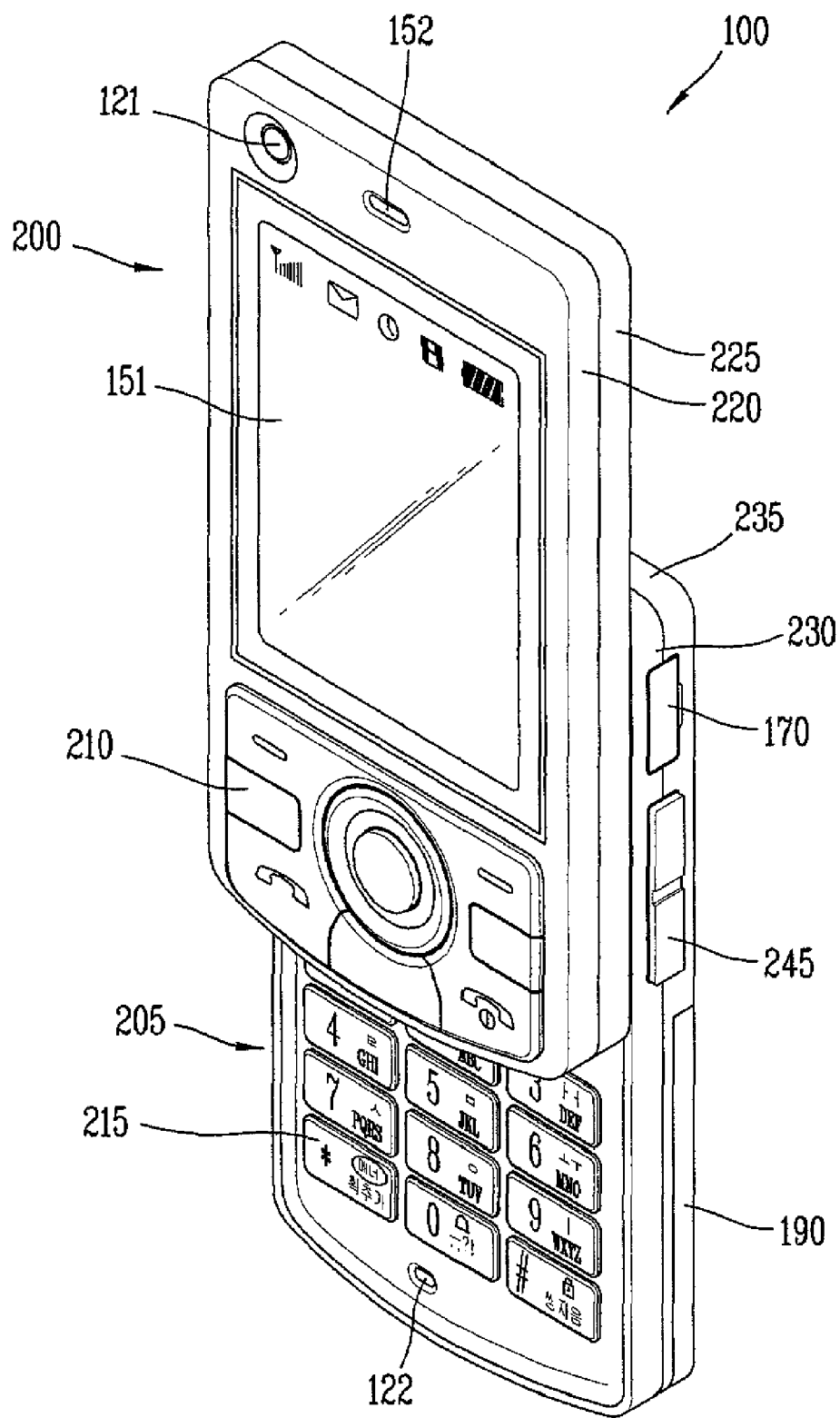

[Fig. 3]
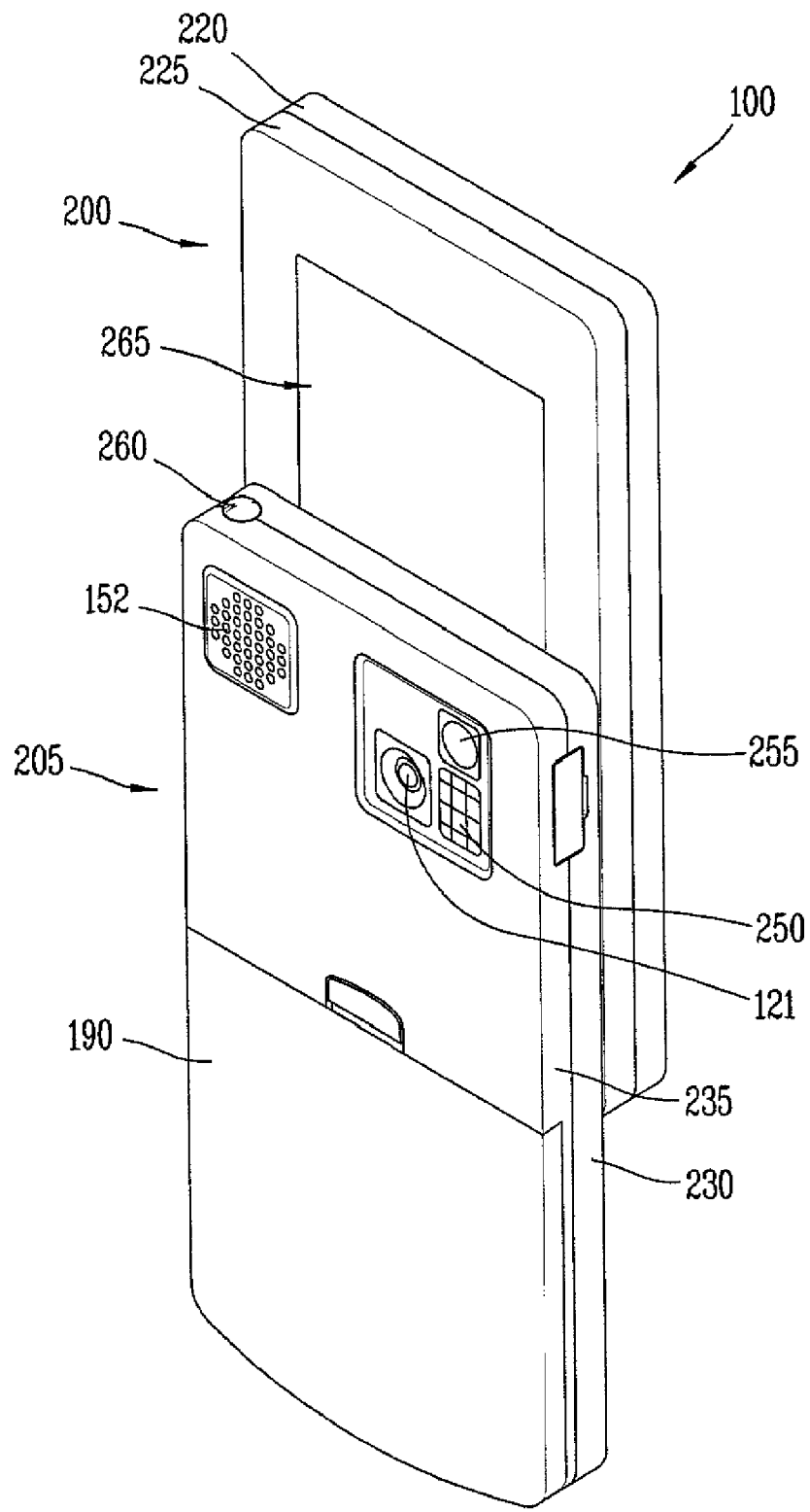

[Fig. 4]
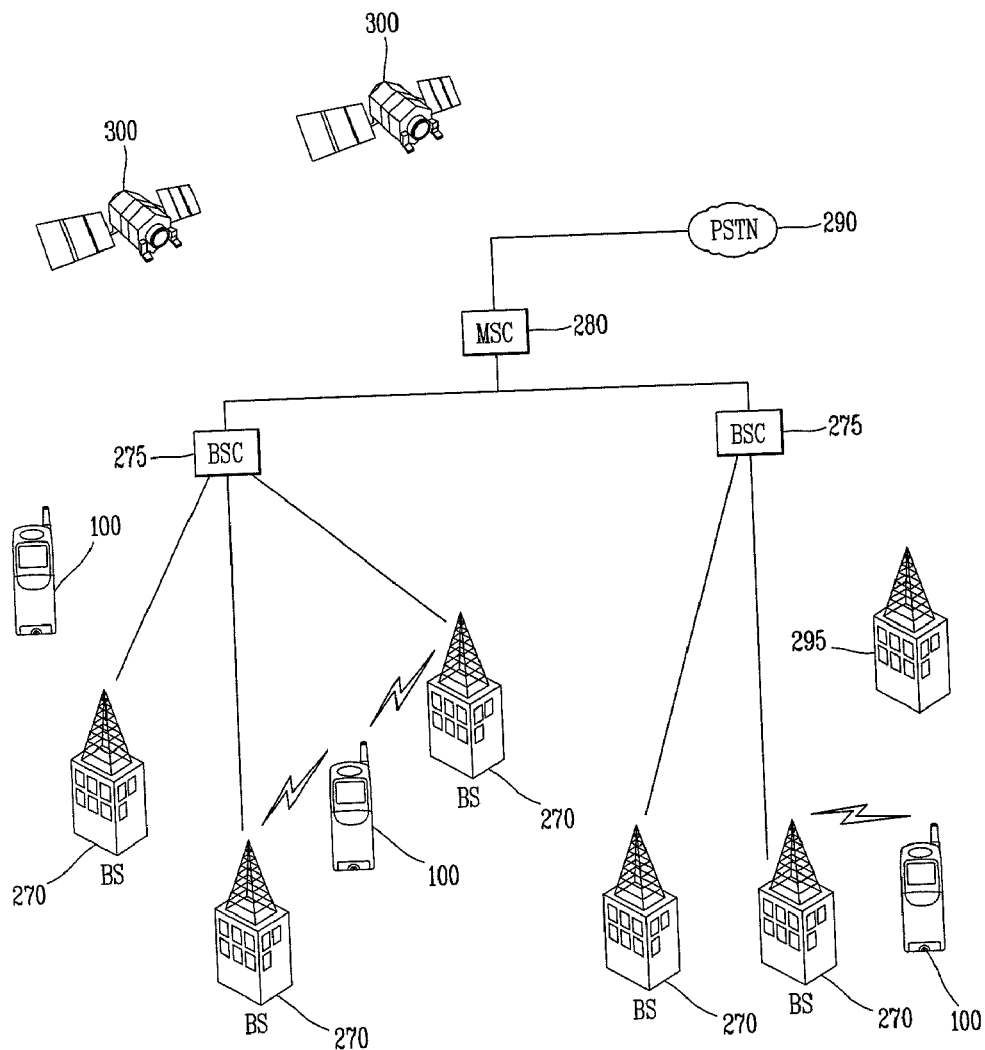
[Fig. 5]
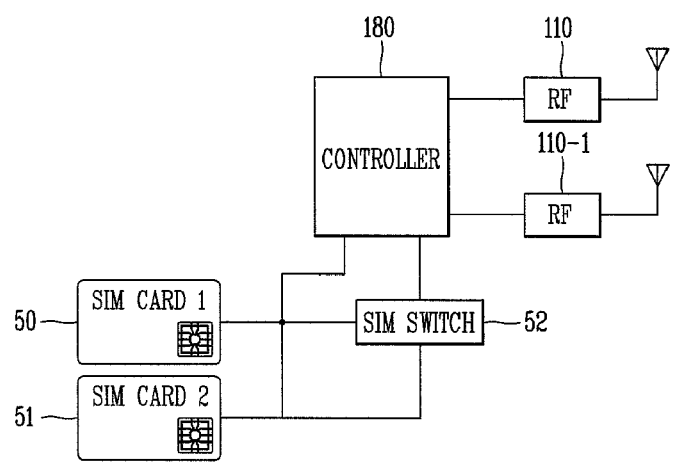

[Fig. 6]
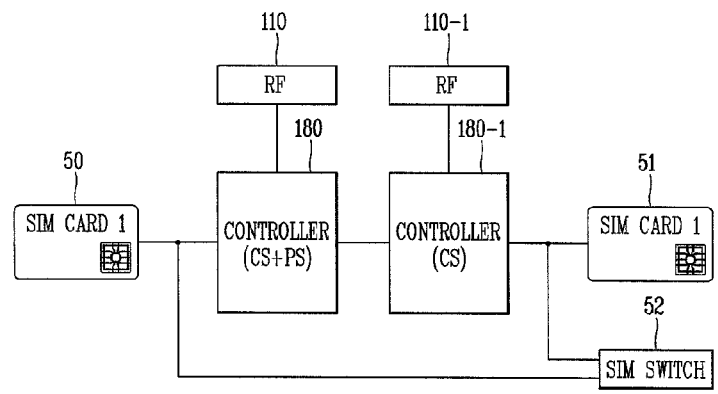
[Fig. 7]
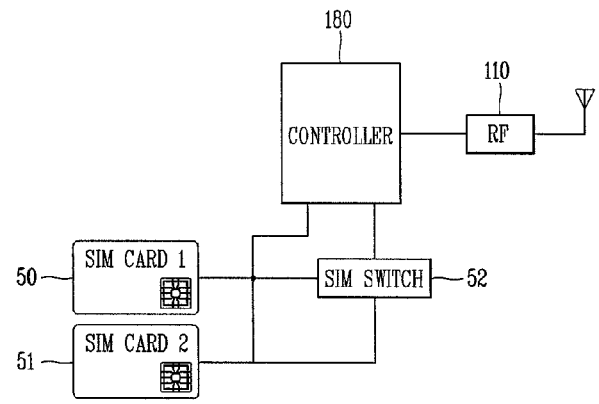
[Fig. 8]
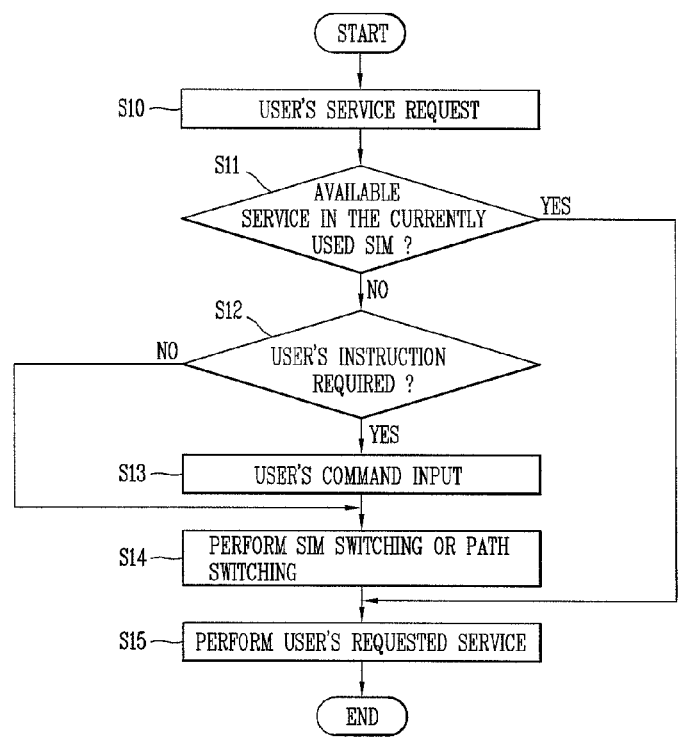

[Fig. 9]
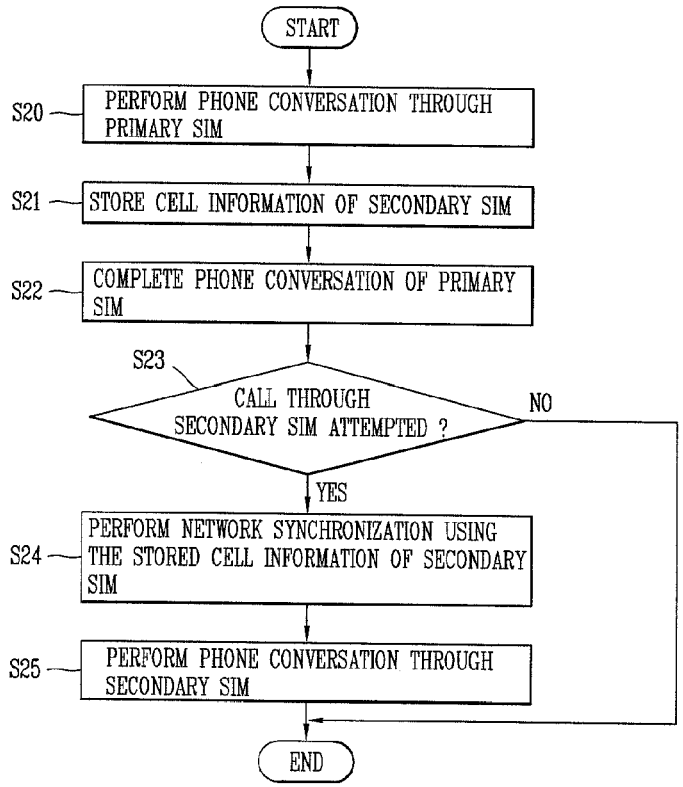
[Fig. 10]
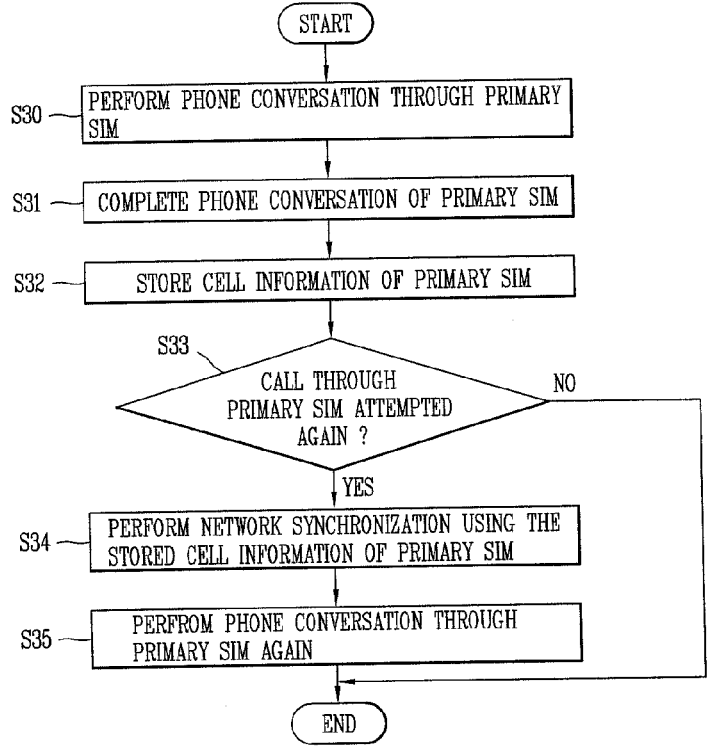

[Fig. 11]
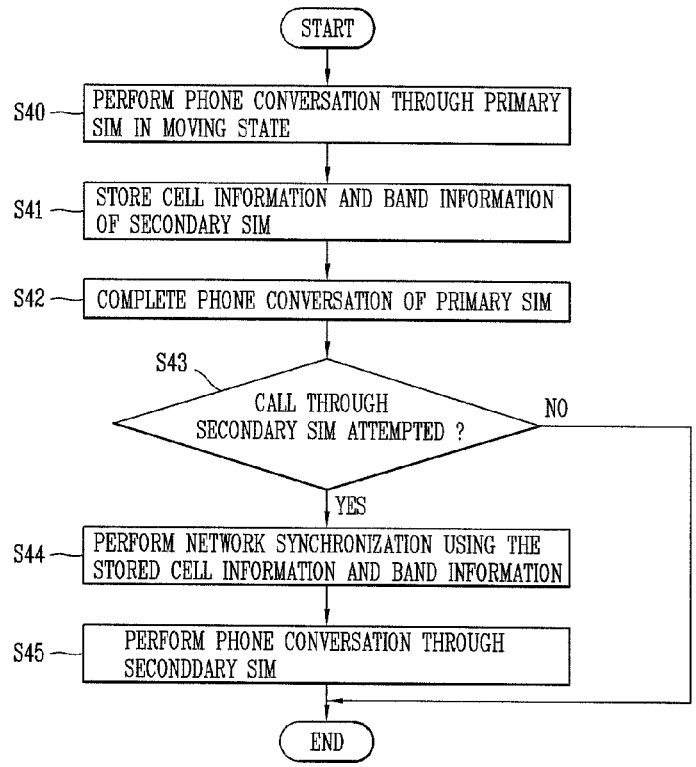
[Fig. 12]
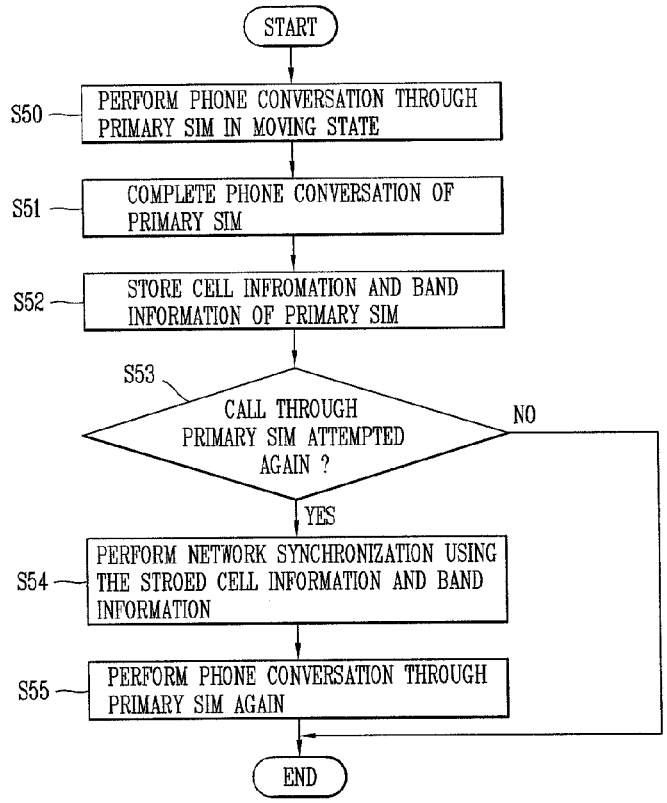

[Fig. 13]
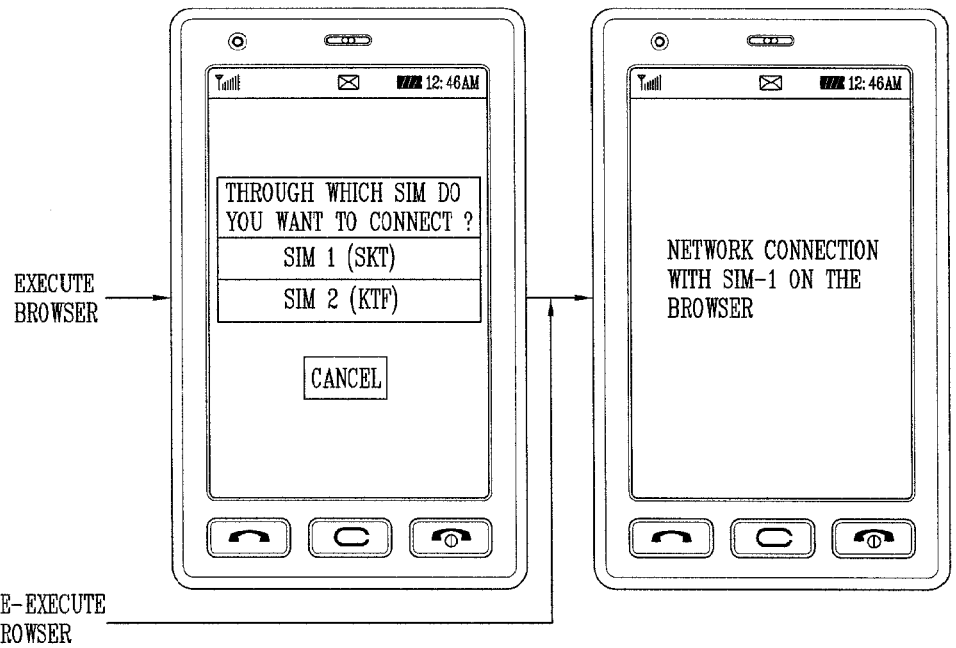
EXECUTE BROWSER
RE-EXECUTE BROWSER
[Fig. 14]
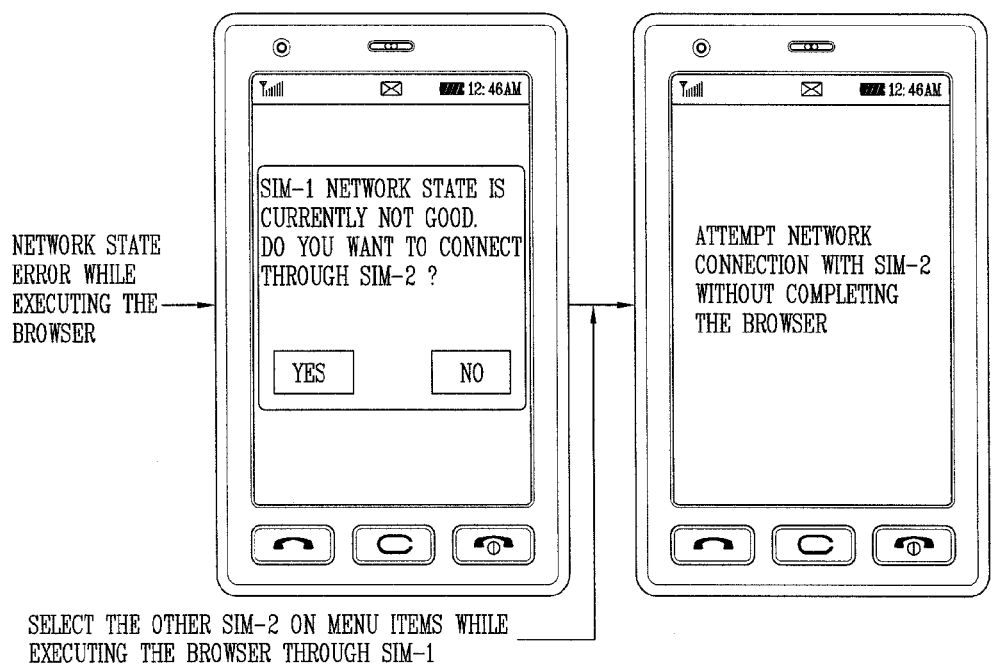
NETWORK STATE ERROR WHILE EXECUTING THE BROWSER
SELECT THE OTHER SIM-2 ON MENU ITEMS WHILE EXECUTING THE BROWSER THROUGH SIM-1

[Fig. 15]
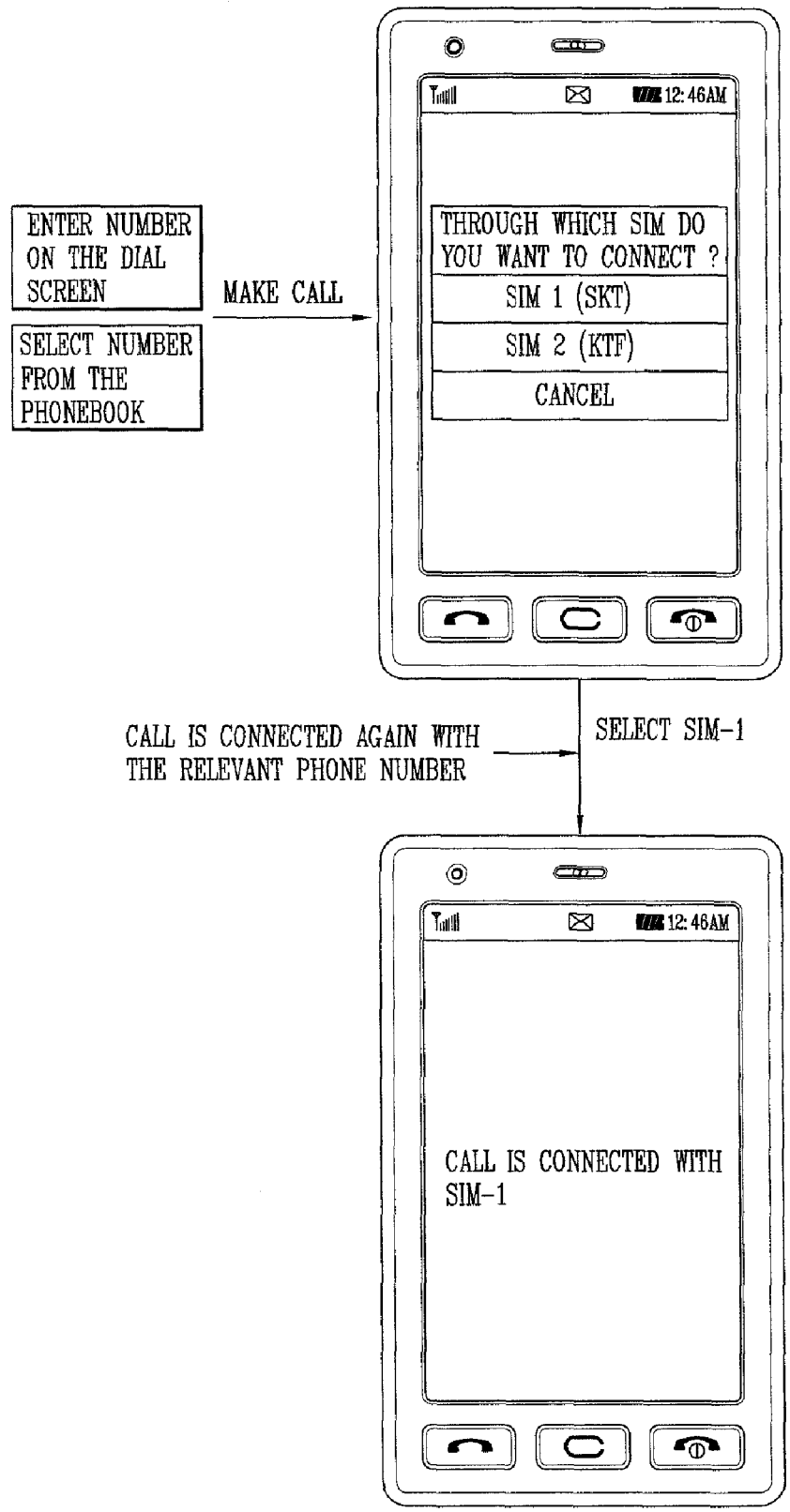

[Fig. 16]
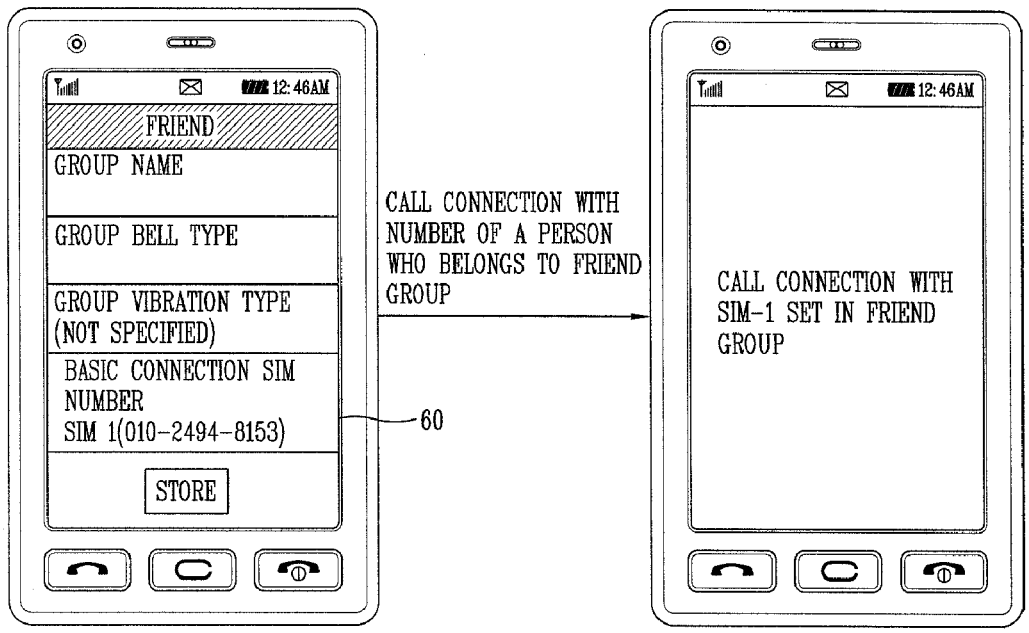
[Fig. 17]
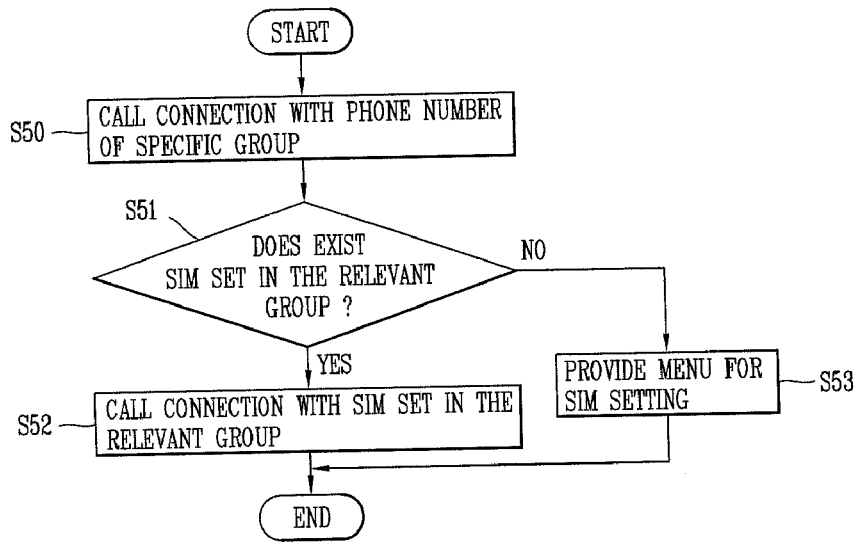

[Fig. 18]
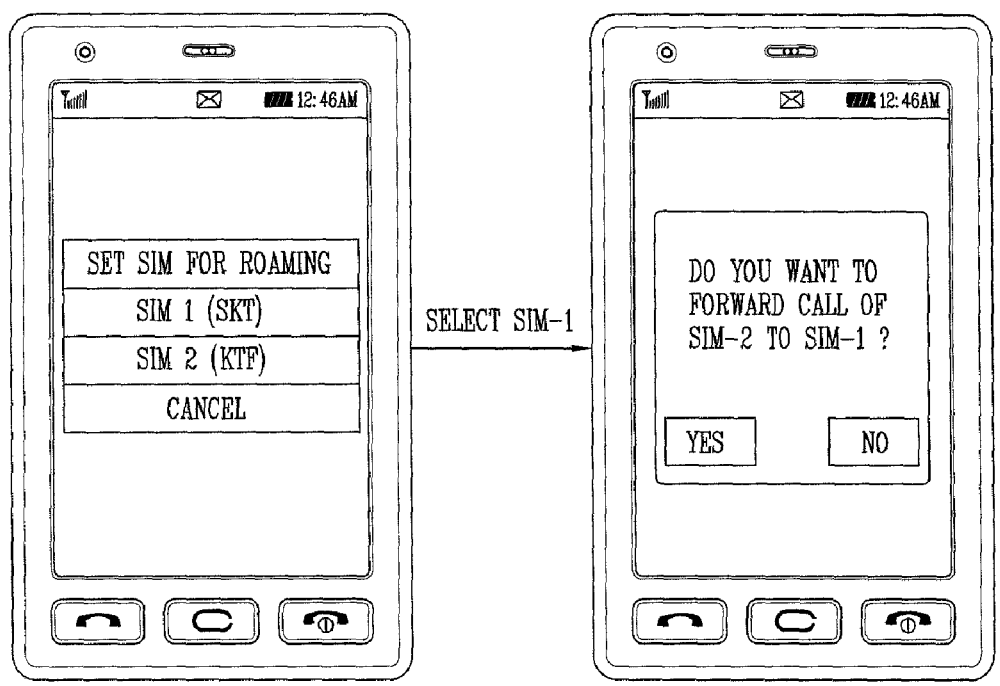

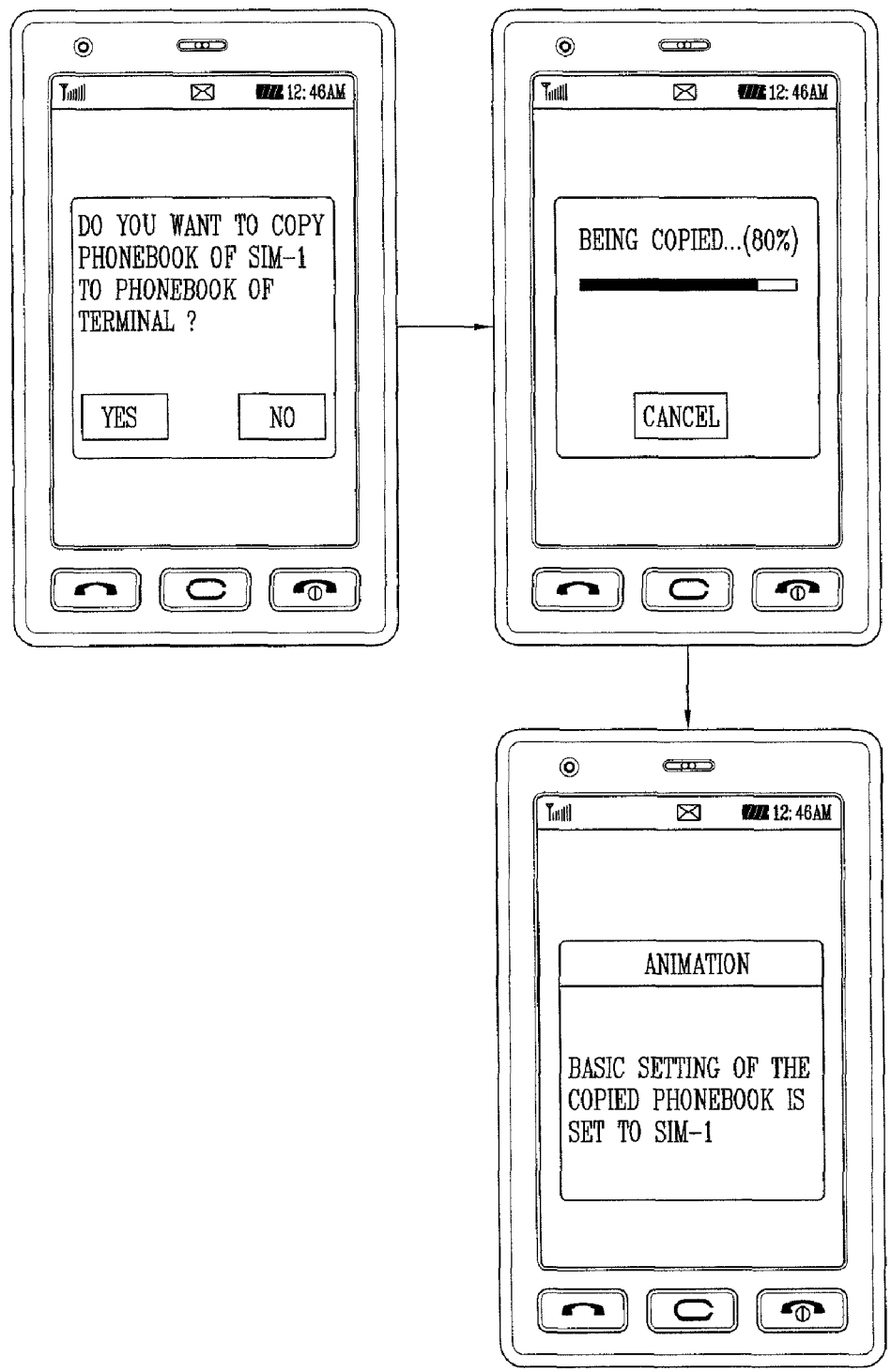
[Fig. 19]

[Fig. 20]
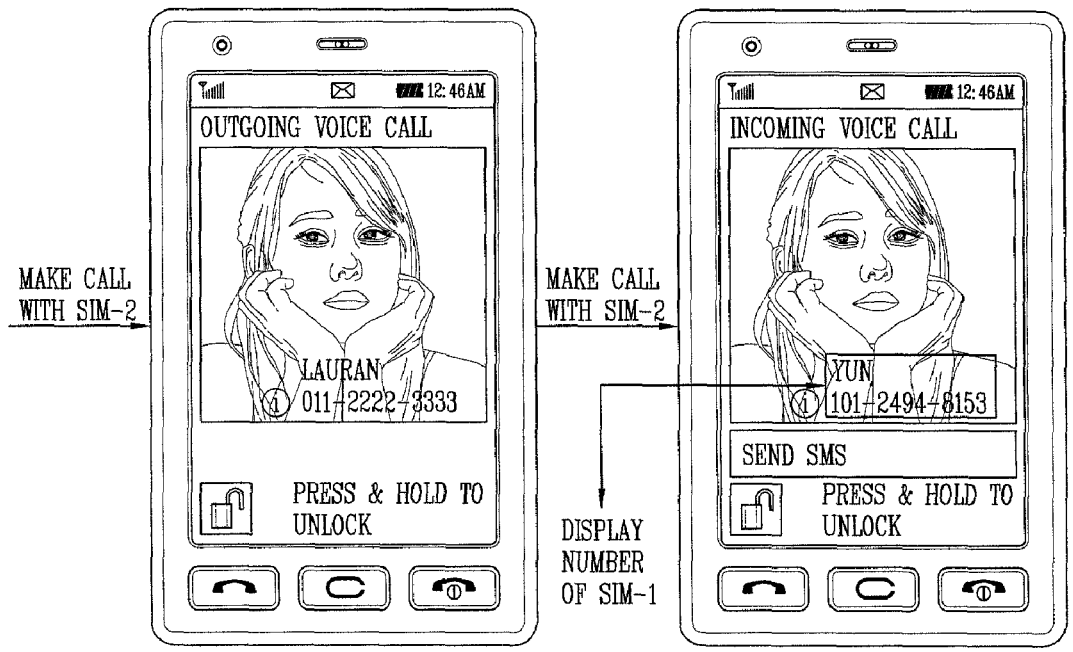
[Fig. 21]
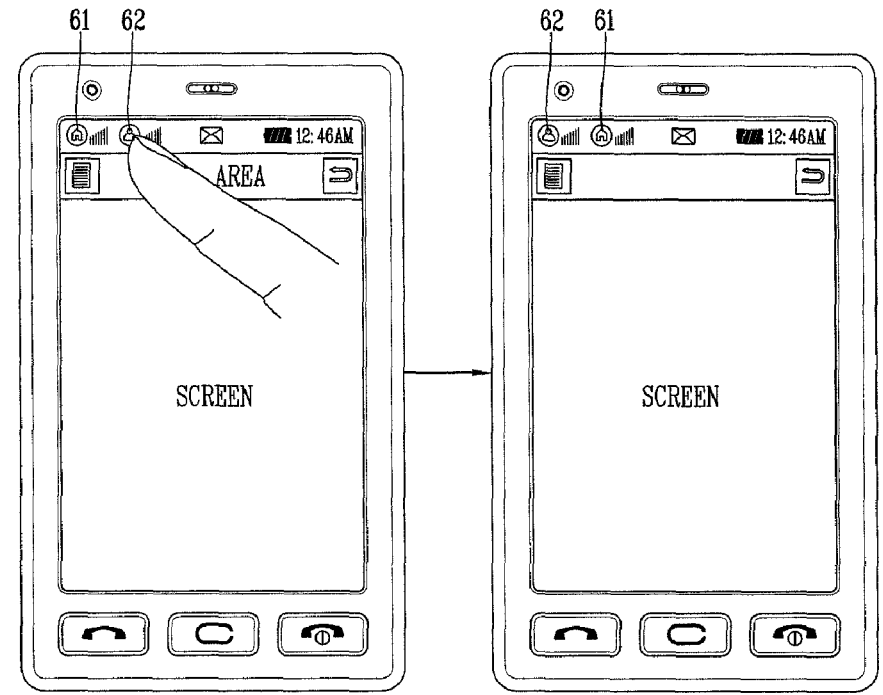
DRAG & DROP OF SIM-2 ICON ONTO SIM-1   SIM-2 BECOMES A PRIMARY SIM

[Fig. 22]
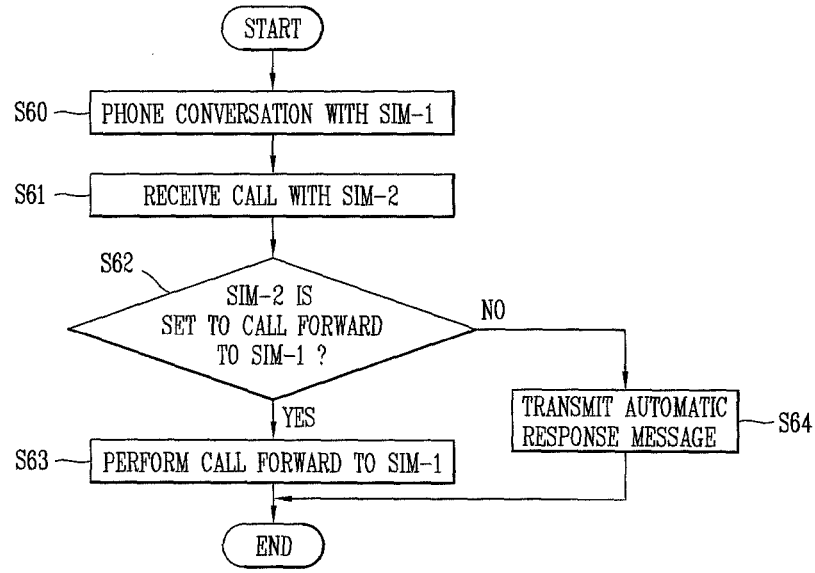
[Fig. 23]
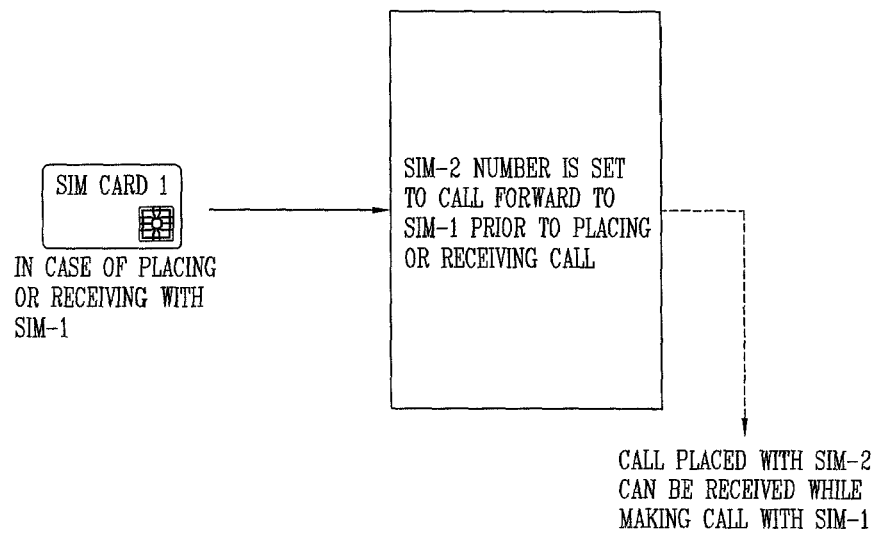
[Fig. 24]
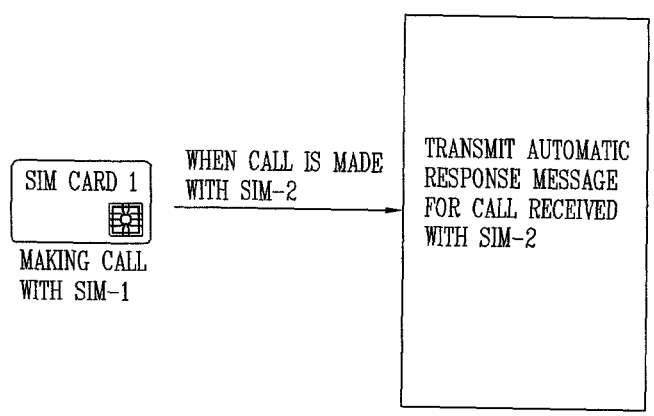

[Fig. 25]
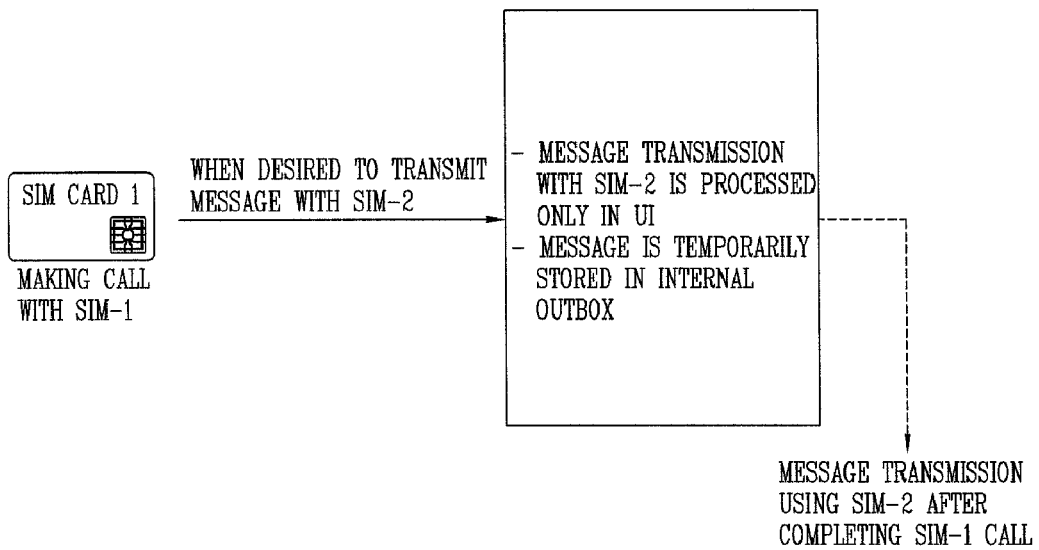
[Fig. 26]
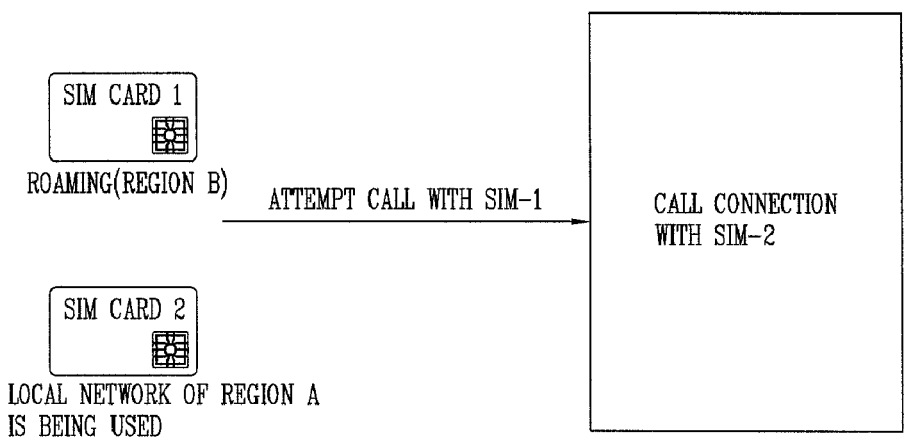
[Fig. 27]
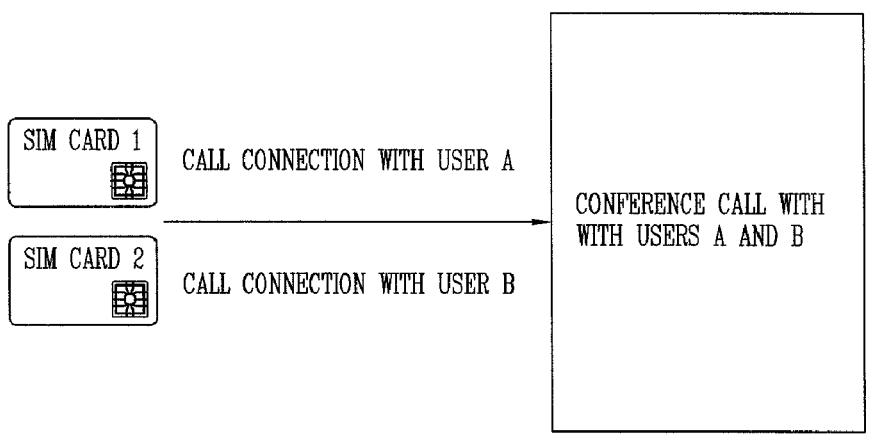

[Fig. 28]
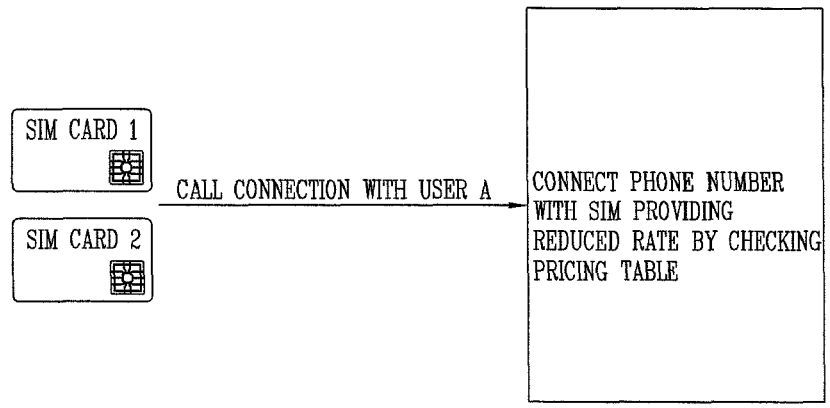
[Fig. 29]
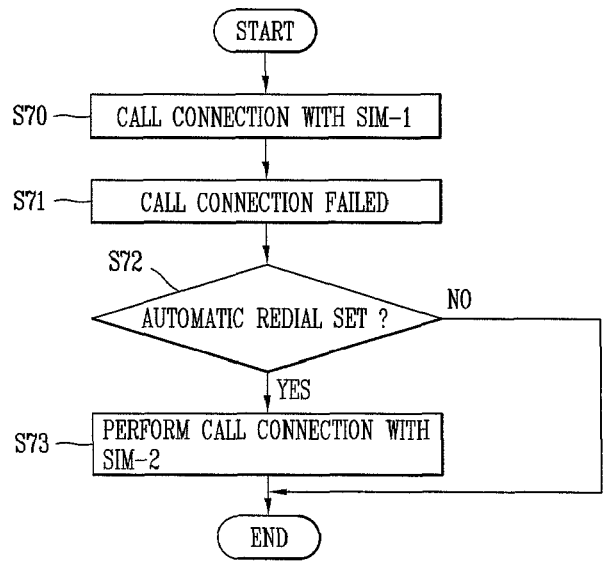
[Fig. 30]
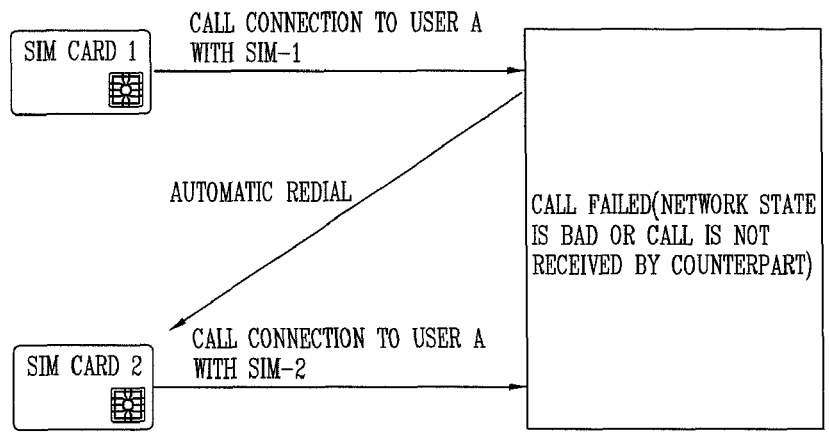

DUAL SIM MOBILE TERMINAL AND OPERATING METHOD THEREOF

TECHNICAL FIELD

The present invention relates to a dual SIM terminal and an operating method thereof for supporting dual standby and single talk using a single baseband.

BACKGROUND ART

A mobile terminal can be configured to perform various functions. Example of such various functions may include a data and voice communication function, a function of capturing still or moving images through a camera, a voice storage function, a function of reproducing music files through a speaker system, a function of displaying image of video files. Some mobile terminals may include an additional function for playing games, and some other mobile terminals may be implemented as a multimedia player. Moreover, new mobile terminals can receive broadcast or multicast signals, allowing the user to view video or TV programs.

Furthermore, the efforts for supporting and enhancing the function of the mobile terminal have been continued. The above efforts include addition and improvement of software or hardware as well as change and improvement of structural constituent elements constituting a mobile terminal.

Among them, the touch function of a mobile terminal allows even users who are unskilled in a button/key input using a touch screen to conveniently perform the operation of a terminal. In recent years, it has settled down as a key function of the terminal along with a user UI in addition to a simple input.

In general, mobile terminals perform wireless communication using a single baseband chipset (controller or processor) and a radio frequency (RF) unit. The aforementioned structure is beneficial to miniaturization and light weight of mobile terminals. However, in case where one RF unit is used in the foregoing single baseband structure, it has a drawback incapable of paging another channel while performing a phone call. In other words, in case of using a single RF chipset, only a standby or transmission/reception for one channel (single standby) can be made (single talk), but a concurrent standby or transmission/reception for another channel (double standby) cannot be made (double talk) during the same timeslot. As a result, the user has nothing to do but receive a limited level of communication quality or communication services in the existing signal baseband structure.

On the other hand, various identification modules, such as, user identity module (UIM), subscriber identity module (SIM), universal subscriber identity module (USIM), and the like, are used to authenticate the user's usage authority. The identification module is connected to a mobile terminal through a port. Among them, for the SIM, there are a single SIM and a dual SIM as a device for storing personal information to provide various services such as authentication, pricing, security, and other functions.

In a terminal employing the single SIM, there is used one SIM, which is connected to one processor. In a terminal employing the dual SIM, there are included a primary SIM (SIM A) and a secondary SIM (SIM B), and the primary SIM is connected to a first processor, and the secondary SIM is connected to a second processor.

However, SIM switching between processors cannot be implemented in mobile terminals having a conventional dual SIM structure. For example, in case where the first processor connected to the primary SIM supports both circuit switched (CS) and packet switched (PS) services but the second processor connected to the secondary SIM supports only CS services, then the second process supports only CS services even though the user wants to use packet services (for example, WAP, MMS, etc.) with a SIM connected to the second processor and thus the user cannot use his or her desired packet services. In this case, the user should manually change a configuration setting between the first and second SIMs and perform a power cycle to use packet services with the secondary SIM.

DISCLOSURE OF INVENTION

Solution to Problem

Accordingly, an object of the present invention is to provide a dual SIM terminal and an operating method thereof for supporting dual standby and single talk using a single baseband.

Another object of the present invention is to provide a dual SIM terminal, and an operating method thereof for performing switching between SIMs according to a network of dual SIM and a state of the network, a pricing system of each SIM, and a user's setting.

Still another object of the present invention is to provide a dual SIM terminal for performing high-speed network synchronization while performing switching between SIMs.

In order to accomplish the foregoing objective, a mobile terminal associated with an embodiment of the present invention may include a dual SIM; a first and a second wireless communication unit; and a controller connected to the dual SIM and the first and second wireless communication units to support double standby and single talk.

The dual SIM may include a primary SIM and a secondary SIM.

The controller pages a network state or receives a call through the second wireless communication unit when making a phone call through a first wireless communication unit.

The controller performs switching between SIMs according to a network of the dual SIM and a state of the network, a pricing system of each SIM, and a user's setting.

The controller performs automatic switching to the secondary SIM if a specific service is unavailable in the primary SIM when the user requests the relevant service through the primary SIM.

The controller performs network synchronization using neighboring cell information of each SIM network if a service requested by the user through the switched SIM is performed and then a service request for the SIM is received again.

The controller provides a menu for selecting a SIM to implement a specific application if the user implements the relevant application for the first time.

The controller provides a menu capable of changing a SIM if a state of the relevant network is not good when implementing a specific application with the SIM.

The controller a menu for selecting a SIM and a menu for setting a call forward when the user roams, makes a call, or transmits a message.

The controller performs a call connection to a SIM set in a group if the relevant group is set with respect to a phone number in a phonebook.

The controller transmits a phone number of the SIM known to the counterpart user if synchronization between dual SIM numbers is performed to make a phone call with a SIM unknown to the counterpart user.

The controller receives a phone call with the primary SIM if the call forward is set, and transmits an automatic response message if the call forward is not set, when the phone call is received with the secondary SIM during phone conversation with the primary SIM.

The controller displays that message transmission has been performed through a user interface (UI), and the relevant message is actually transmitted at the timing when a phone conversation is completed if the message transmission is requested with the other SIM number while performing the phone conversation using one SIM network.

The controller transmits a phone call or message through a SIM number to which roaming is not set if roaming is set to the other SIM number in a network of the dual SIM.

The controller performs a call connection to a SIM number providing a reduced rate by referring to a prestored pricing table when the user makes a phone call to a specific region or specific number.

The controller attempts a call connection using the primary SIM if automatic redial is set when a call using the primary SIM is failed.

In order to accomplish the foregoing objective, an operating method of a dual SIM mobile terminal associated with embodiment of the present invention may include detecting an active state of the dual SIM; automatically performing SIM switching according to a network state of the SIM and a user's service request if the initial user's service is requested in an active state of the dual SIM; and performing a service requested by the user through the switched SIM.

Preferably, automatic switching is performed to the secondary SIM if a specific service is unavailable in the primary SIM when the user requests the relevant service through the primary SIM.

The operating method of a dual SIM mobile terminal associated with embodiment of the present invention may further include providing a menu for selecting a SIM to implement a specific application if the user implements the relevant application for the first time.

The operating method of a dual SIM mobile terminal associated with embodiment of the present invention may further include providing a menu capable of changing a SIM if a state of the relevant network is not good when implementing a specific application with the SIM.

The operating method of a dual SIM mobile terminal associated with embodiment of the present invention may further include providing a menu for selecting a SIM and a menu for setting a call forward when the user roams, makes a call, or transmits a message.

Preferably, the SIM switching step performs a call connection to a SIM set in a group if the relevant group is set with respect to a phone number in a phonebook when the user makes a call with one phone number.

Preferably, the SIM switching step transmits a phone number of the SIM known to the counterpart user if synchronization between dual SIM numbers is performed to make a phone call with a SIM unknown to the counterpart user.

Preferably, the SIM switching step may include checking whether or not call forward is set if a phone call is received during phone conversation with the selected SIM; and receiving the phone call with the selected SIM if the call forward is set, and transmitting an automatic response message if the call forward is not set.

Preferably, the SIM switching step may include receiving a transmission request for a specific message from the secondary SIM during phone conversation with the primary SIM; displaying message transmission complete through a user interface (UI) and storing the relevant message into the outbox according to the message transmission request; and transmitting the message stored in the outbox if the phone conversation with the primary SIM is completed.

Preferably, the SIM switching step transmits a phone call or message through a SIM number to which roaming is not set if roaming is set to the other SIM number in a network of the dual SIM.

Preferably, SIM switching step performs a call connection to a SIM number providing a reduced rate by referring to a prestored pricing table when the user makes a phone call to a specific region or specific number.

Preferably, the SIM switching step attempts a call connection using the primary SIM if automatic redial is set when a call using the primary SIM is failed.

Preferably, the SIM switching step may further include performing network synchronization using neighboring cell information of each SIM network if a service requested by the user through the switched SIM is performed and then a service request for the SIM is received again. The service request for the SIM again may include a service request between same SIMs and a service request between heterogeneous SIMs.

BRIEF DESCRIPTION OF DRAWINGS

FIG. 1 is a block diagram illustrating a mobile terminal associated with an embodiment of the present invention;

FIG. 2 is a front perspective view illustrating a mobile terminal associated with an embodiment of the present invention;

FIG. 3 is a rear perspective view illustrating a mobile terminal associated with an embodiment of the present invention;

FIG. 4 is a block diagram illustrating a wireless communication system that can be operated by a mobile terminal associated with an embodiment of the present invention;

FIG. 5 is a configuration diagram illustrating a dual SIM mobile terminal according to an embodiment of the present invention;

FIG. 6 is a view illustrating a SIM switching structure in a dual SIM mobile terminal according to an embodiment of the present invention;

FIG. 7 is a view illustrating an example of SIM switching in a dual SIM mobile terminal according to an embodiment of the present invention;

FIG. 8 is a flow chart illustrating a SIM switching method in a single chip structure according to an embodiment of the present invention;

FIG. 9 is a flow chart illustrating an embodiment of an effective synchronization search method when implementing double standby and single talk using a single chip in an embodiment of the present invention;

FIG. 10 is a flow chart illustrating another embodiment of an effective synchronization search method when implementing double standby and single talk using a single chip in an embodiment of the present invention;

FIGS. 11 and 12 illustrate an embodiment of an effective synchronization search method when implementing double standby and single talk using a single chip in a moving state in an embodiment of the present invention;

FIG. 13 is a view illustrating default SIM settings for each module in a dual SIM mobile terminal according to the present invention;

FIG. 14 is a view illustrating a SIM handover function for each module in a dual SIM mobile terminal according to the present invention;

FIG. 15 is a view illustrating a SIM storage function for each phone number in a dual SIM mobile terminal according to the present invention;

FIG. 16 is an embodiment illustrating a SIM setting method for each group in a dual SIM mobile terminal according to the present invention;

FIG. 17 is a flow chart illustrating a method of performing a call connection according to SIM settings for each group according to the present invention;

FIG. 18 is an embodiment illustrating automatic SIM switching when roaming in a dual SIM mobile terminal according to the present invention;

FIG. 19 is an embodiment illustrating a basic setting when copying a phonebook of the SIM to a phonebook of the terminal in a dual SIM mobile terminal according to the present invention;

FIG. 20 is a view illustrating an example of a synchronization service of a SIM number in a dual SIM mobile terminal according to the present invention;

FIG. 21 is an embodiment illustrating a network priority change for a SIM in a dual SIM mobile terminal according to the present invention;

FIG. 22 is a flow chart illustrating an operation when a phone call is received through the other SIM number during phone conversation in a dual SIM mobile terminal according to the present invention;

FIG. 23 is a view illustrating an example of setting a call forward to another number during phone conversation in FIG. 22;

FIG. 24 is a view illustrating an example of performing a message transmission during phone conversation in FIG. 22;

FIG. 25 is an embodiment illustrating a message transmission method using the other SIM number during phone conversation in a dual SIM mobile terminal according to the present invention;

FIG. 26 is a view illustrating a phone-call method when there is a roaming number in a dual SIM mobile terminal according to the present invention;

FIG. 27 is a view illustrating a method of performing a conference call in a dual SIM mobile terminal according to the present invention;

FIG. 28 is an embodiment altitude a call connection method using a dual SIM in a dual SIM mobile terminal according to the present invention; and FIG. 29 is a flow chart illustrating a redialing method using a dual SIM in a dual SIM mobile terminal according to the present invention.

FIG. 30 is a view illustrating an embodiment in which automatic redialing as illustrated in FIG. 29 is performed.

MODE FOR THE INVENTION

Hereinafter, a mobile terminal associated with the present invention will be described in more detail with reference to the accompanying drawings. A suffix "module" or "unit" used for constituent elements disclosed in the following description is merely intended for easy description of the specification, and the suffix itself does not give any special meaning or function. Therefore, it should be noted that the suffix "module" or "unit" may be interchangeably used each other.

A terminal can be implemented in various forms. A terminal disclosed herein may include mobile terminals such as a portable phone, a smart phone, a laptop computer, a digital broadcast terminal, a personal digital assistant (PDA), a portable multimedia player (PMP), a navigation, and the like, and stationary terminals such as a digital TV, a desktop computer, and the like. In the following description, it is assumed and described that the terminal is a mobile terminal. However, it would be easily understood by those skilled in the art that a configuration according to the following description may be applicable to the stationary terminal excluding constituent elements particularly configured for mobile purposes.

FIG. 1 is a block diagram illustrating a mobile terminal associated with an embodiment of the present invention.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more modules allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast associated information may mean information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a Global Positioning System (GPS) module as a representative example. According to current technologies, the GPS module calculates spaced-apart distance information and accurate time information from three or more satellites and then applies trigonometry to the calculated information, thereby accurately calculating current position information based on latitude, longitude, and height. At present, there is widely used a method of calculating position and time information using three satellites and correcting an error of the calculated position and time information using another satellite. Furthermore, the GPS module can calculate speed information by continuously calculating a current position in real time.

On the other hand, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like. Particularly, when the touch pad forms an interlayer structure together with a display unit 151 which will be described later, it may be called a touch screen.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141. It will be described later in association with a touch screen.

The interface unit 170 performs a role of interfacing with all external devices connected to the mobile terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

Here, the identification module may be configured as a chip for storing various information required to authenticate an authority for using the mobile terminal 100, which may include a User Identity Module (UIM), a Subscriber Identity Module (SIM), and the like. Also, the device provided with the identification module (hereinafter, referred to as identification device) may be implemented in the type of a smart card. Hence, the identification device can be coupled to the mobile terminal 100 via a port. The interface units 170, 175 may receive data or power from an external device and transfer the received data or power to each constituent element in the mobile terminal 100, or transmit data within the mobile terminal 100 to the external device.

Also, the interface unit 170 may serve as a path for power to be supplied from an external cradle to the mobile terminal 100 when the portable terminal 100 is connected to the external cradle, or as a path for transferring various command signals inputted from the cradle by the user to the mobile terminal 100. Such various command signals or power inputted from the cradle may be operated as signals for recognizing that the mobile terminal 100 has accurately been mounted on the cradle.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

On the other hand, as described above, in case where the display unit 151 and the touch pad form an interlayer structure to constitute a touch screen, the display unit first display unit 151 may be used as an input device in addition to an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display. Some of those displays may be configured with a transparent type to allow viewing of the exterior through the display unit, which may be called transparent displays. An example of the typical transparent displays may include a transparent LCD (TOLED), and the like. The display unit 151 may be implemented in two or more in number according to a configured aspect of the mobile terminal 100. For example, an external display unit (not shown) and an internal display unit (not shown) may be simultaneously provided on the mobile terminal 100. The touch screen may be configured to detect a touch input pressure as well as a touch input position and area.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the mobile terminal may include call received, message received, key signal input, touch input, and so on. The alarm 153 may output not only video or audio signals, but also other types of signals such as signals notifying occurrence of events in a vibration manner. When a call signal or message is received, the alarm 153 may output a vibration to notify this. Otherwise, when a key signal is inputted, the alarm 153 may output a vibration as a feedback to the inputted key signal. Through the foregoing vibration output, the user can recognize an event occurrence. The signal for notifying an event occurrence may be also outputted through the display unit 151 or the audio output module 152.

The memory 160 may store a program for processing and controlling of the controller 180, or may temporarily store input/output data (e.g., phonebook data, messages, still images, video and the like). Also, the memory 160 may store data related to various patterns of vibrations and audio output upon a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may manage a web storage which performs a storage function of the memory 160 on the Internet.

The controller 180 typically controls an overall operation of the portable terminal 100. For example, the controller 180 performs the control and processing associated with telephony calls, data communications, video calls, and the like. Furthermore, the controller 180 may include a multimedia module 181 for reproducing multimedia files. The multimedia module 181 may be implemented in the controller 180, or may be implemented separately from the controller 180.

The controller 180 can perform a pattern recognition processing so as to recognize handwriting or drawing input performed on the touch screen as a text or image.

The power supply unit 190 provides power required by various components under the control of the controller 180. The provided power may be internal power, or external power thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

In the above, a mobile terminal associated with the present invention has been described from a viewpoint of function-based elements. Hereinafter, further referring to FIGS. 2 and 3, a mobile terminal associated with the present invention will be described from a viewpoint of appearance-based elements. For the sake of brevity of explanation, a slider-type mobile terminal will be described below as an example, among various types of mobile terminals such as folder type, bar type, swing type, slider type, and the like. As a result, the present invention is not limited to a slider-type mobile terminal, but may be applicable to all types of mobile terminals including the forgoing type.

FIG. 2 is a front perspective view illustrating an example of a mobile terminal associated with the present invention.

The mobile terminal 100 according to the present invention may include a first body 200 and a second body 205, which is configured to be slidably moved along at least one direction against the first body 200. In case of a folder phone, the mobile terminal 100 may include may include a first body and a second body, at least one side of which is configured to be folded or unfolded against the first body.

A state in which the first body 200 is disposed to be overlapped with the second body 205 may be referred to as a closed configuration, and a state in which at least part of the second body 205 is exposed from the first body 205 may be referred to as an open configuration.

On the other hand, the mobile terminal associated with the present invention, though not shown in the drawing, may be a folder type including a first body and a second body, at least one side of which is folded or unfolded against the first body. Here, a state in which the second body is configured to be folded may be referred to as a closed configuration, and a state in which the second body is configured to be exposed may be referred to as an open configuration.

Moreover, the mobile terminal associated with the present invention, though not shown in the drawing, may be a swing type including a first body and a second body, at least one side of which is configured to be swung against the first body. Here, a state in which the first body is disposed to be overlapped with the second body may be referred to as a closed configuration, and a state in which the second body is swung to expose part of the first body may be referred to as an open configuration.

A terminal according to the folder type and the swing type can be easily understood with no additional explanation by those skilled in the art, and thus the detailed description thereof will be omitted.

The mobile terminal 100 is primarily operated in a standby mode in a closed configuration but the standby mode may be released by the manipulation of the user. Furthermore, the mobile terminal 100 is primarily operated in a phone call mode or the like in an open configuration but may be switched into the standby mode by the user's manipulation or after passing a predetermined period of time.

A case (casing, housing, cover, etc.) forming an appearance of the first body 200 is formed with a first front case 220 and a first rear case 225. Various electronic components are built in a space formed between the first front case 220 and the first rear case 225. In this embodiment, the case may be divided into a front case 101 and a rear case 102. At least one intermediate case may be additionally disposed between the first front case 220 and the first rear case 225.

The cases may be formed by injection-molding a synthetic resin or may be also formed of a metal material such as stainless steel (STS), titanium (Ti), or the like.

A display unit 151, an audio output module 152, and a camera 121 or first user input unit 210 may be arranged on the first body, particularly, the first front case 220.

The display unit 151 has be described in association with FIG. 1 and thus the detailed description thereof will be omitted for the sake of brevity of this specification.

The LED unit 152 may be implemented in the form of a speaker.

The camera 121 may be implemented suitably to capture still or moving images for the user or the like.

Similarly to the first body 200, a case forming an appearance of the second body 205 is formed with a second front case 230 and a second rear case 235.

A second user input unit 215 may be disposed on the second body 205, particularly, on a front face of the second front case 230.

A third user input unit 245, a microphone 122, an interface unit 170 may be disposed on at least one of the second front case 230 and the second rear case 235.

The first through the third user input units 210, 215, 245 may be commonly designated as a user input unit 130, and any method may be employed if it is a tactile manner allowing the user to manipulate with a tactile feeling.

For example, the user input unit may be implemented with a dome switch or touch pad capable of receiving a command or information by a user's push or touch manipulation, or may be also implemented using a wheel or jog method for rotating a key or using a method of manipulating a joystick, or the like.

From a functional viewpoint, the first user input unit 210 is provided to input commands such as start, end, scroll, or the like, and the second user input unit 215 is provided to input information such as numerals or characters, symbols, or the like. The first user input unit 210 may include a so-called soft key used in conjunction with icons displayed on the display unit 151, and navigation keys (mainly, configured with four directional keys and center key) for directing and confirming the direction.

Furthermore, the third user input unit 245 may operates as a hot-key for activating a special function in the mobile terminal.

The microphone 122 may be implemented in a suitable form to receive a user's voice, other sounds, or the like.

The interface unit 170 serves as a path allowing the mobile terminal 100 associated with the present invention to exchange data with external devices. In the above, the interface unit 170 has been described in association with FIG. 1, and thus the detailed description thereof will be omitted.

The power supply unit 190 for supplying power to the mobile terminal 100 is mounted at a side of the second rear case 235.

The power supply unit 190 may be detachably coupled with the mobile terminal 100 for charging or the like as a battery.

FIG. 3 is a rear perspective view illustrating a mobile terminal of FIG. 2.

Referring to FIG. 3, a camera 121 may be additionally mounted on a rear surface of the second rear case 235 of the second body 205. The camera 121 of the second body 205 may have an image capturing direction that is substantially opposite to the direction of the camera 121 of the first body 200, and may have a different number of pixels from that of the first video input unit 121.

For example, it is preferable that the camera 121 of the first body 200 has a relatively small number of pixels enough not to cause a difficulty when the user captures his or her own face and sends it to the other party during a video call or the like, and the camera 121 of the second body has a relatively large number of pixels since the user often captures a general object that is not sent immediately.

A flash 250 and a mirror 255 may be additionally disposed adjacent to the camera 121 of the second body 205. The flash 250 illuminates light toward an object when capturing the object with the camera 121 of the second body 205. The mirror 255 allows the user to look at his or her own face, or the like, in a reflected way when capturing himself or herself (in a self-portrait mode) by using the camera 121 of the second body 205.

An audio output unit 152 may be additionally disposed on the second rear case 235.

The audio output unit 152 of the second rear case 235 together with the audio output unit 152 of the first body 200 can implement a stereo function, and may be also used to implement a speaker phone mode during a phone call.

Furthermore, in addition to an antenna for performing a phone conversation, an antenna 260 for receiving broadcast signals may be disposed on a side of the second rear case 235. The antenna 260 may be provided so as to be pulled out from the second body 205.

A portion of the slide module 265 for slidably coupling the first body 200 with the second body 205 is disposed at a side of the first rear case 225 of the first body 200.

The other portion of the slide module 265 is disposed at a side of the second front case 230 of the second body 205, in the form of not being exposed to the outside.

In the above, it has been described that the second camera 121 is disposed at the second body 205, but it should not be necessarily limited to this.

For example, similarly to the camera 121 of the second body, at least one of the configurations (260, 121 through 250, 152), which have been described to be disposed at the second rear case 235, may be also mounted on the first rear case 225. In this case, it has an advantage that configuration(s) disposed at the first rear case 225 in the closed configuration is protected by the second body 205. Moreover, even though the camera 121 of the second body is not provided in a separate manner, the camera 121 of the first body may be formed in a rotatable manner to capture even a capturing direction of the camera 121 of the second body.

A terminal 100 as illustrated in FIGS. 1 through 3 may be configured to be operated in a communication system capable of transmitting data via frames or packets including a wireless or wired communication system and a satellite-based communication system.

Hereinafter, referring to FIG. 4, a communication system in which a terminal associated with the present invention is operable will be described.

A communication system may use different wireless interfaces and/or physical layers. For example, a wireless that can be used by a communication system may include Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), and the like. Hereinafter, for the sake of convenience of explanation, it will be described to be limited to CDMA. However, it is apparent that the present invention may be applicable to all kinds of communication systems including a CDMA wireless communication system.

As illustrated in FIG. 4, a CDMA communication system is configured to be connected to a plurality of terminals 100, a plurality of base stations (BSs) 270, a plurality of base station controllers (BSCs) 275, and a mobile switching center (MSC) 280. The MSC 280 is configured to be connected to a public switched telephone network (PSTN) 290, and also configured to be connected to BSCs 275. The BSCs 275 may be connected to BSs 270 in pairs through a backhaul line. The backhaul line may be provided with at least one of E1/T1, ATM, IP, PPP, Frame Relay, HDSL, ADSL, and xDSL. Accordingly, a plurality of BSCs 275 may be included in a system as illustrated in FIG. 4.

Each BS 270 may include at least one sector, and each sector may include an omni-directional antenna or an antenna directing a specific radial direction from the BS 270. Alternatively, each sector may include two or more antennas in various shapes. Each BS 270 may also be configured to support allocation of a plurality of frequencies in which each frequency allocation has a specific spectrum (for example, 1.25 MHz, 5 MHz, etc.).

An intersection between the sector and the frequency allocation may be referred to as a CDMA channel. The BSs 270 may also be referred to as Base Station Transceiver Subsystems (BTSs). In this case, the term "base station" may refer to a combination of one BSC 275 and at least one BS 270. The base station may also designate a "cell site". Alternately, each of the sectors with respect to a specific BS 270 may be referred to as a plurality of cell sites.

As illustrated in FIG. 4, a Broadcasting Transmitter (BT) 295 serves to transmit a broadcast signal to the terminals 100 operating in the system. The broadcast receiving module 111 illustrated in FIG. 1 is provided in the terminal 100 so as to receive the broadcast signal transmitted by the BT 295.

Moreover, FIG. 4 illustrates multiple Global Positioning System (GPS) satellites 300. The satellites 300 serve to detect a position of at least one of the multiple terminals 100. Two satellites are illustrated in FIG. 4, however, useful position information may be obtained by more or less than two satellites. The GPS module 115 illustrated in FIG. 1 cooperates with the satellites 300 so as to obtain desiring position information. Here, the module 115 can track the position using all techniques allowing to track positions, as well as the GPS tracking technology. Also, at least one of the GPS satellites 300 may handle satellite DMB transmission alternatively or additionally.

Among typical operations of a wireless communication system, a BS 270 serves to receive reverse link signals from various terminals 100. At this time, the terminal 100 is connecting a call, transmitting and/or receiving a message or executing other communication operations. Each reverse link signal received by a specific base station 270 is processed within the specific BS 270. Data generated resulting from the processing is transmitted to the connected BSC 275. The BSC 275 serves to allocate a call resource and manage mobility, including systemization of soft handoffs between the BSs 270. Also, the BSC 275 transmits the received data to the MSC 280, and then the MSC 280 provides an additional transmission service so as to be connected to a PSTN 290. Similarly, the PSTN 290 is connected to the MSC 280 and the MSC 280 is connected to the BSCs 275, and the BSCs 275 control the BSs 270 so as to transmit forward link signals to the terminals 100.

The present invention proposes a method in which a service that has been performed through two SIMs connected to two mobile terminals respectively can be effectively performed even with one mobile terminal.

FIG. 5 is a configuration diagram illustrating a dual SIM mobile terminal according to an embodiment of the present invention.

As illustrated in FIG. 5, a dual SIM mobile terminal according to an embodiment of the present invention may include a controller 180, and two radio frequency (RF) units 110, 110-1, and dual SIMs 50, 51. In other words, the present invention is basically formed with a single chipset structure.

In other words, the controller 180 can perform phone conversation through two channels using RFs 110, 110-1 (double talk) respectively, or monitor the state of two channels (double standby). Alternatively, the controller 180 can perform data transmission and reception for one channel through a RF 110 (single talk) while at the same time monitoring the state of the other channel through the other RF 110-1.

The foregoing structure using a single chipset (one controller) and two RFs can overcome the disadvantage of a conventional structure using a single chipset and one RF (in which data transmission and reception cannot be performed through the other channel during phone conversation), and it has an advantage capable of implementing double standby and double talk with a low cost compared to the structure of a typical dual chipsets (two controllers) and two RFs.

Dual SIMs 50, 51 may be provided to implement double standby and double talk in the structure of a single chipset and two RFs. At this time, the SIM 50 is a primary SIM and the SIM 51 is a secondary SIM, and those two SIMs are selectively connected to the controller 180 through a SIM switch 52. The SIM switch 52 is configured with a cross switch.

The controller 180 controls to perform SIM switching between two SIMs 50, 51 when two SIMs 50, 51 provide different services, thereby providing the user's desired service through each of the RFs 110, 110-1 even without performing a power cycle as in the related art. Preferably, the SIM switching is made according to a kind of service requested by the user, a network state of two SIMs, a charge, and a user's setting.

For example, in case where the primary SIM 50 supports circuit switched (CS) and packet switched (PS) services while the secondary SIM 51 supports circuit switched services, the user cannot use PS services with the number of the secondary SIM 51, and a service is blocked if the service is selected with the SIM 51 when the SIM 51 is not in a normal service state.

In this case, the controller 180 automatically switches the primary and secondary SIMs 50, 51, thereby switching to the SIM having a higher service success probability by monitoring a network state in each of the SIMs 50, 51.

The SIM switching may be performed between two chipsets (primary, secondary) as well as in one chipset as illustrated in FIG. 5. In FIG. 6, it is illustrated a SIM switching in the structure of dual chipsets and two RFs.

Referring to FIG. 6, the controller 180 as a primary chipset is connected to SIM-1 50 and the controller 180-1 as a secondary chipset is connected to SIM-2 51, and the two SIMs 50, 51 are connected to each other through a SIM switch 52. Accordingly, for example, in case where the controller 180 supports circuit switched (CS) and packet switched (PS) services while the controller 180-1 supports CS services, the user is allowed to use his or her desired service by switching SIM-2 51 to the controller 180 if the user wants to use packet services (for example, WAP, MMS, etc.) through SIM-2 51.

In addition, the SIM switching may be implemented according to the network or service subscribed by the subscriber (network or service in which the SIM is used) as well as the service provided by the controllers 180, 180-1. In other words, in case where SIM-1 is used in a SKT network, and SIM-2 is used in a KTF network, a SIM switching is performed according to the network (or service) subscribed by each SIM.

Alternatively, the SIM switching may be implemented even in the structure using a single chipset and one RF as illustrated in FIG. 7. In this case, the controller 180 is only able to automatically switch primary and secondary SIMs 50, 51 but is unable to switch to the SIM having a higher service success probability by monitoring a network state as illustrated in FIG. 5. It is because the structure of a single chipset and 1 RF monitors only one network state.

FIG. 8 is a flow chart illustrating a SIM switching method in a single chip structure according to an embodiment of the present invention.

As illustrated in FIG. 8, if the user requests a service for a specific application (S10), then the controller 180 checks whether or not the requested service is an available service at the SIMs 50, 51 that are being currently connected (S11). As a result of the check, if the requested service is not currently available at the SIMs 50, 51, then the controller 180 notifies the user to receive the user's command (S12, S13), and then automatically performs SIM switching (FIGS. 5 and 7) or path switching (FIG. 6), thereby performing the user requested service (S14, S15). On the contrary, if the requested service is currently available at the SIMs 50, 51, then the controller 180 performs the user requested service (S15).

According to the present invention, when two SIMs 50, 51 use different public land mobile networks (PLMN) (in case of different service providers), a dual SIM mobile terminal using a single chipset stores cell information used in the relevant network, thereby allowing fast dual standby when entering from exclusive mode to idle mode or reentering to exclusive mode.

FIG. 9 is a flow chart illustrating an embodiment of an effective synchronization search method when implementing double standby and single talk using a single chip.

As illustrated in FIG. 9, if the user performs phone conversation through a network of the primary SIM 50 (S20) in a state that the primary SIM 50 and the secondary SIM 51 are in an active state, then the secondary SIM 51 will be disconnected from the network (exclusive mode idle mode). At this time, the controller 180 stores neighboring cell information of the secondary SIM 51 (S21).

Subsequently, if phone conversation through a network of the primary SIM 50 is completed (S22) and a call through the secondary SIM 51 is attempted (S23), then the controller 180 preferentially searches the stored cell information to adjust network synchronization, and then performs a call back through the secondary SIM 51 (S34, S35). If network synchronization is not implemented with the stored cell information, then the controller 180 sequentially searches the remaining cell information to adjust network synchronization. Accordingly, according to the present invention, it may be possible to drastically reduce the time consumed for adjusting network synchronization in the related art.

FIG. 10 is a flow chart illustrating another embodiment of an effective synchronization search method when implementing double standby and single talk using a single chip. FIG. 10 illustrates a synchronization search method in case of reentering to the same exclusive mode after being switched from exclusive mode to idle mode.

Referring to FIG. 10, if the user performs an application, then the controller 180 performs phone conversation through a network of the primary SIM 50 according to the user's selection (S30). If the phone conversation through the network of the primary SIM 50 is finished, then the controller 180 stores neighboring cell information of the primary SIM 50 (S31).

Subsequently, if the user performs a call back through the primary SIM 50 (S33), then the controller 180 primarily searches the stored cell information to adjust network synchronization, then the controller 180 performs a call back through the primary SIM 50 (S34, S35).

In FIGS. 9 and 10, network synchronization is found by using neighboring cell information when the user implements double standby and single talk in a stop state. However, in case where the user implements double standby and single talk through a dual SIM terminal in a moving state, it should be considered band information as well as neighboring cell information.

FIGS. 11 and 12 illustrate an embodiment of an effective synchronization search method when implementing double standby and single talk using a single chip in a moving state.

FIG. 11 corresponds to FIG. 9, and FIG. 12 corresponds to FIG. 10. In other words, FIG. 11 is a synchronization search method in case of reentering to another exclusive mode after being switched from exclusive mode to idle mode in a moving state, band information as well as neighboring cell information is stored and then primarily used during a cell search.

Furthermore, FIG. 12 is a synchronization search method in case of reentering to the same exclusive mode after being switched from exclusive mode to idle mode in a moving state, band information as well as neighboring cell information is stored and then primarily used during a cell search, similarly to FIG. 11.

Hereinafter, an operating method and a user interface thereof related to a dual SIM in a double standby and single talk manner according to an embodiment of the present invention will be described.

FIG. 13 is a view illustrating default SIM settings for each module in a dual SIM mobile terminal according to the present invention.

If two SIMs (primary SIM, secondary SIM) 50, 51 are connected and both two SIMs are in an active state when the user executes an application, the controller 180 should determine through which SIM network the application is to be executed. According to the present invention, there is provided a method capable of automatically and conveniently selecting an application without selecting a SIM whenever the user's application is entered.

As illustrated in FIG. 13, if an application (browser) is executed, then the controller 180 displays SIMs (SIM-1 and SIM-2) 50, 51 to be selected along with a selection option for selecting a SIM on the screen of the display unit 151, namely, a text phrase, "Through which SIM do you want to connect a network?" The selection option is displayed in a pop-up window or in a shape that can be recognized by other users.

For the selection option, the kind of the SIM is displayed together with the name of the network provided by the relevant SIM. For example, SIM-1 50 as a primary SIM supports SKT services, and SIM-2 51 as a secondary SIM supports KT services.

In the selection option, if SIM-1 50 is selected, then the controller 180 performs network connection through SIM-1 50 and the RF 110 on the browser. Subsequently, if the user re-executes the browser, then the controller 180 attempts a network connection through the previously executed SIM-1 50. In this case, a cell search method in FIGS. 10 and 12 will be used in an effective way.

FIG. 14 is a view illustrating a SIM handover (switching) function for each module in a dual SIM mobile terminal using a single chipset according to the present invention.

If the relevant SIM cannot be used any longer due to a state of the currently used SIM being not good, a charge, and the like when two SIMs (primary SIM, secondary SIM) 50, 51 are connected and a specific application is implemented with a specific SIM, then the controller 180 should change the currently used SIM to the other SIM. In this case, according to the present invention, a SIM switching operation is performed as illustrated in FIG. 8, thereby allowing the user to use an application by switching the network to the other SIM without completing the application.

As illustrated in FIG. 14, if a state of network connection is poor while performing an application (browser), then the controller 180 provides a selection option for automatically connecting to the other SIM. If the user selects a connection through SIM-2 51 on the selection option, then the controller 180 attempts a network connection through SIM-2 51 without completing the browser. Subsequently, if a connection of the other SIM-2 is selected on the menu selection while executing the browser through SIM-1 50, then the controller 180 attempts a network connection through SIM-2 51 without completing the browser.

FIG. 15 is a view illustrating a SIM storage function for each phone number in a dual SIM mobile terminal using a single chipset according to the present invention.

If a call is made by using a phone number stored in a phonebook or an inputted phone number, then the controller 180 should determine through which SIM the user performs a call connection. According to the present invention, there is provided a selection option capable of selecting a SIM if the user enters a phone number, thereby allowing the user to conveniently perform a phone conversation without selecting the SIM whenever the user enters the phone number.

In other words, as illustrated in FIG. 15, if a phone number is entered on a dial screen or a specific phone number is selected in a phonebook, then the controller 180 displays SIMs (SIM-1 and SIM-2) 50, 51 to be selected, along with a separate selection menu (selection option) on the screen of the display unit 151, namely, a text phrase, "Through which SIM do you want to connect a network?" The selection option is displayed in a pop-up window or in a shape that can be recognized by other users. At this time, SIM-1 50 as a primary SIM supports SKT services, and SIM-2 51 as a secondary SIM supports KT services.

If SIM-1 50 is selected in the selection option, then the controller 180 performs a call connection through SIM-1 50 and the RF 110 on the browser. Subsequently, if the user performs a call connection with the relevant phone number again, then the controller 180 attempts a call connection through the previously executed SIM-1 50.

FIG. 16 is an embodiment illustrating a SIM setting method for each group in a dual SIM mobile terminal using a single chipset according to the present invention.

An embodiment shown in FIG. 16 illustrates an example in which a call connection is performed through a set SIM for the number of a group if the relevant group is set for the phone number of the phonebook. According to the above embodiment, for example, if it is classified by at least one or groups, it may be possible to make a call or transmit and/or receive a message through the relevant SIM without individually setting the SIM.

In other words, as illustrated in FIG. 16, according to the present invention, a SIM setting region 60 is added to each group (for example, friend group), thereby allowing the user to establish a basic connection SIM number desired for each group. Accordingly, the controller 180 performs a call connection using SIM-1 50, which has been set for the friend group, if the call connection is attempted with the phone number of a person who belongs to the friend group.

FIG. 17 is a flow chart illustrating a method of performing a call connection according to SIM settings for each group using a single chipset according to the present invention.

As illustrated in FIG. 17, if a specific user attempts a call connection to a phone number which belongs to a specific group (friend group) (S50), then the controller 180 searches a SIM setting region 60 of the friend group to check whether or not a SIM, namely, a basic connection SIM number, is set (S51). As a result of the check, if a basic connection SIM number (for example, SIM-1) is set in the SIM setting region 60 of the friend group, then the controller 180 performs a call connection through SIM-1 set for the friend group (S52). On the contrary, if a basic connection SIM number (for example, SIM-1) is not set in the SIM setting region 60 of the friend group, then the controller 180 may provide a selection menu for setting a SIM as illustrated in FIG. 13 (S53).

In a dual SIM mobile terminal using a single chipset according to the present invention, in case of overseas roaming services, the charge may be different according to the SIM. Accordingly, the present invention supports the terminal user to automatically set a lower-priced SIM during a travel or overseas business trip because the pricing policy may be different for each country or region. For this purpose, according to the present invention, there is provided a menu capable of setting a SIM to be used at the time of roaming on the user menu. As a result, if one SIM is specified as a SIM setting at the time of roaming in a dual SIM mobile terminal, then the other SIM is automatically call-forwarded to the set SIM number.

FIG. 18 is an embodiment illustrating automatic SIM switching when roaming in a dual SIM mobile terminal using a single chipset according to the present invention.

As illustrated in FIG. 18, if a dual SIM mobile terminal roams, then the controller 180 provides a SIM setting menu for setting a SIM to be used at the time of roaming on the screen. On the SIM setting menu, a currently connected SIM may be merely displayed, and may be displayed in the order of lower-priced SIM according to the pricing policy. If the user set SIM-1 as a SIM to be used at the time of roaming, then the controller 180 provides a call forward menu on the screen, thereby allowing a call of the other SIM-2 to be forwarded to the set SIM-1. As a result, if the user sets a call forward to the set SIM-1 on a call of SIM-2, then the controller 180 forwards a call made through SIM-2 to SIM-1.

A dual SIM mobile terminal using a single chipset provides a function capable of copying information (e.g., phonebook) stored in the SIM to a mobile terminal. However, there is difficulty for the user to set a phone number again for each SIM when copying a phonebook stored in the SIM. As a result, according to the present invention, when copying phone numbers from a start-up wizard or SIM to a terminal, it may be possible to reduce additional setting burden by automatically specifying a SIM to which the basic setting have been copied.

FIG. 19 is an embodiment illustrating a basic setting when copying a phonebook of the SIM to a phonebook of the terminal in a dual SIM mobile terminal using a single chipset according to the present invention.

As illustrated in FIG. 19, if the user selects a phonebook copy of SIM-1 on the menu, then the controller 180 displays a copying state of the phonebook (telephone directory) of SIM-1 on the screen, and displays a message that the basic settings of the copied phonebook is set to SIM-1 when the copy is completed.

In a dual SIM mobile terminal using a single chipset according to the present invention, when the counterpart knows the number of SIM-1 but does not know the number of SIM-2, such a case may happen that in spite of the same user the counterpart does not know who the caller is if the user makes a call to the counterpart using SIM-2. Such a case may correspond to a case where the reliability for SIM-1 is low or a call is made by using SIM-2 without using SIM-1 that has been always used in order to obtain a reduced rate for a particular time period. In this case, according to the present invention, a synchronization is performed between the two SIM numbers to display the phone number of SIM-1 for the counterpart even though a call is made through SIM-2 which is not known to the counterpart, thereby allowing the counterpart to recognize that a call is currently made through SIM-1.

FIG. 20 is a view illustrating an example of a synchronization service of a SIM number in a dual SIM mobile terminal using a single chipset according to the present invention.

Referring to FIG. 20, a number synchronization is performed between SIM-1 and SIM-2, and when the user makes a call with SIM-2 which is not known to the counterpart, the controller 180 displays the phone number of SIM-2 (011-2222-3333) on the screen of the display unit 151 and transmits the phone number of SIM-1 (010-2494-8135) through the wireless communication unit 110. Accordingly, the phone number of SIM-1 (010-2494-8135) is displayed on the screen of the caller (counterpart) terminal, thereby allowing the caller to recognize that a call is made through SIM-1.

Furthermore, in a dual SIM mobile terminal according to the present invention, two SIMs mounted with a chip are provided only at a front surface of the SIM, thereby causing a cost and spatial restriction. As a result, according to the present invention, a chip for retrieving SIM information is not only adhered to one surface of the SIM but also adhered to both surfaces of the SIM, thereby providing an effect similar to the effect of mounting two SIMs on the space of one SIM.

FIG. 21 is an embodiment illustrating a network priority change for a SIM in a dual SIM mobile terminal using a single chipset according to the present invention.

As illustrated in FIG. 13, if the user selects the primary SIM 50 when both the primary SIM 50 and the secondary SIM 51 are in an active state, then the controller 180 displays a network priority for the SIM on the screen while performing a network connection through the primary SIM 50 on the browser. In other words, the primary SIM 50 and the secondary SIM 51 are displayed with icons 61, 62 respectively on an upper side of the standby screen.

If the user drags the secondary SIM icon 62 and drops it onto a side of the primary SIM icon 61 in this state, then the controller 180 changes the network priority of the primary SIM 50 and the secondary SIM 51. In other words, the secondary SIM 51 will be a primary SIM, and the primary SIM 50 will be a secondary SIM.

In a dual SIM mobile terminal using a single chipset according to the present invention, the user cannot perform a call or message transmission and reception with the other SIM number while performing a phone conversation over a network through one SIM number. In this case, according to the present invention, the user may set a call forward or transmits an automatic response message to the counterpart to provide a smooth service thereof.

FIG. 22 is a flow chart illustrating an operation when a phone call is received through the other SIM number during phone conversation in a dual SIM mobile terminal using a single chipset according to the present invention.

As illustrated in FIG. 22, if a call is received with the SIM-2 number while making a call with SIM-1 (S60, S61), then the controller 180 checks whether or not the SIM-2 number is set to a call forward to SIM-1 (S62). As a result of the check, the controller 180 performs a call forward to SIM-1 (S63) if the SIM-2 number is set to a call forward to SIM-1, and transmits an automatic response message, "I'll give you a call again in a minute," if the SIM-2 number is not set to a call forward to SIM-1 (S64).

FIG. 23 is a view illustrating an example of setting a call forward to another number during phone conversation in FIG. 22.

If a call is received with the SIM-2 number while making a call using SIM-1, then the user cannot receive the SIM-2 call. Accordingly, if the SIM-2 number is set to a call forward to SIM-1 prior to making or receiving a call with SIM-1 50, then the user can receive a call through SIM-1 even if the call is received with SIM-2 while making a call with SIM-1.

FIG. 24 is a view illustrating an example of performing a message transmission during phone conversation in FIG. 22.

As illustrated in FIG. 24, if a call is received with the SIM-2 number while making a call using SIM-1, then the user cannot receive the call. Accordingly, according to the present invention, an automatic response message, "I'll give you a call again in a minute," will be transmitted for the call received with SIM-2 if the call is received with the SIM-2 number while the user making a call with SIM-1 50.

FIG. 25 is an embodiment illustrating a message transmission method using the other SIM number during phone conversation in a dual SIM mobile terminal using a single chipset according to the present invention.

As described in the above, it is not possible to perform a call and message transmission with the SIM-2 number while making a call using a network of SIM-1. As a result, according to the present invention, a message to be transmitted is stored in the outbox and then the message is transmitted after the phone conversation is completed, and it may seem to the user that message transmission is always possible.

In other words, if the user performs message transmission with SIM-2 while making a call with SIM-1, then controller 180 displays that message transmission has been performed through a user interface (UI), and the relevant message is actually stored in the outbox but not transmitted actually. Then, if the phone conversation through SIM-1 is completed, then the controller 180 transmits the message stored in the outbox through the SIM-2.

FIG. 26 is a view illustrating a phone-call method when there is a roaming number in a dual SIM mobile terminal using a single chipset according to the present invention.

In an embodiment illustrated in FIG. 26, if one of two SIM networks is set to a roaming network, then the SIM number having a roaming network is not automatically used, and a call or message is transmitted with the SIM number having no roaming network. At this time, it is displayed for the user that a call seems to be made with the original SIM-1 number.

If the user attempts a call or message transmission with SIM-1 50 when two SIMs 50, 51 are both in an active state, then the controller 180 checks whether or not there exists a roaming network in the networks of the SIM-1 50 and SIM-2 51. As a result of the check, the controller 180 performs a call or message transmission using a local network of region "A" because there exists a roaming network in the SIM-1 50, thereby showing the user that the call or message transmission seems to be implemented by using the currently used SIM-1 number.

According to the present invention, a conference call may be implemented by using a dual SIM. The present invention allows double standby and double talk to be implemented by using the structure of a single chipset and two RFs, thereby performing a conference call by concurrently connecting calls for two SIM numbers and then combining the two calls. In addition, as illustrated in FIG. 6, even if there exist two controllers (basebands), two calls are connected through each controller, respectively, and the connected two calls are combined together to perform a conference call.

FIG. 28 is an embodiment altitude a call connection method using a dual SIM in a dual SIM mobile terminal using a single chipset according to the present invention. FIG. 28 illustrates an embodiment in which a call connection is performed with a SIM providing a reduced rate.

In order to perform an embodiment illustrated in FIG. 28, pricing tables for each SIM may be stored in the memory 160. When the user places a call with a specific region or number, the controller 180 refers to the pricing tables stored in the memory 160, thereby connecting a call with the SIM number providing a reduced rate. At this time, if the number which is known to the counterpart is SIM-1, then the number of SIM-1 is always shown to the counterpart.

FIG. 29 is a flow chart illustrating a redialing method using a dual SIM in a dual SIM mobile terminal using a single chipset according to the present invention.

As illustrated in FIG. 29, if the user requests a call connection through SIM-1, then the controller attempts a call connection with the counterpart through the SIM-1 number (S70). However, if a state of the SIM-1 network is not good or a call connection is failed because the counterpart does not receive a call (S71), then the controller 180 checks whether or not an automatic redialing function is set. As a result of the check, if the automatic redialing function is set, then the controller 180 performs a call connection with the number of SIM-2 (S73).

FIG. 30 is a view illustrating an embodiment in which automatic redialing as illustrated in FIG. 29 is performed. As illustrated in FIG. 29, in case where the automatic redialing function is set, if a call connection is failed when making a call with the SIM-1 number, a call made for the second time automatically performs a call connection with the number of SIM-2.

As described above, according to the present invention, there is provided a dual SIM mobile terminal for supporting double standby and single talk using a single baseband, thereby having an effect that a user's desired service can be provided at a reduced rate.

Furthermore, according to the present invention, there is provided a SIM switching and call connection method suitable for various situations in a dual SIM mobile terminal for supporting double standby and single talk, thereby having an effect that a communication service can be more effectively provided to the user.

In addition, according to the present invention, a photo of the counterpart stored (or not stored) in a phonebook is remotely requested by using various functions of a mobile terminal to add or update phonebook photos, thereby having an effect that phonebook data can be more conveniently managed.

Furthermore, according to an embodiment of the present invention, the foregoing method may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented via a carrier wave (for example, a transmission via the Internet). The computer may include the controller 180 of the mobile terminal 100.

The configurations and methods according to the above-described embodiments will not be applicable in a limited way to the foregoing terminal, and all or part of each embodiment may be selectively combined and configured to make various modifications thereto.

The invention claimed is:

1. A dual SIM mobile terminal, comprising:
a dual SIM configured to support different services, the dual SIM including a primary SIM and a secondary SIM;
a first and a second wireless communication unit; and
a controller connected to the dual SIM and the first and second wireless communication units to support double standby and single talk,
wherein the controller performs network synchronization using neighboring cell information of each SIM network if a service requested by the user through the switched SIM is performed and then a service request for the SIM is received again.

2. The dual SIM mobile terminal of claim 1, wherein the controller pages a network state or receives a call through the second wireless communication unit when making a phone call through a first wireless communication unit.

3. The dual SIM mobile terminal of claim 1, wherein the controller performs switching between SIMs according to a network of the dual SIM and a state of the network, a pricing system of each SIM, and a user's setting.

4. The dual SIM mobile terminal of claim 1, wherein the controller performs automatic switching to the secondary SIM if a specific service is unavailable in the primary SIM when the user requests the relevant service through the primary SIM.

5. The dual SIM mobile terminal of claim 1, wherein the controller searches network synchronization using the stored neighboring cell information of a secondary SIM network if a phone call is initiated to the secondary SIM network subsequent to making a phone call to a primary SIM network in a stop state.

6. The dual SIM mobile terminal of claim 1, wherein the controller searches network synchronization using the stored neighboring cell information and band information of a secondary SIM network if a phone call is initiated to the secondary SIM network subsequent to making a phone call to a primary SIM network in a moving state.

7. The dual SIM mobile terminal of claim 1, wherein the controller provides a menu for selecting a SIM to implement a specific application if the user implements the relevant application for the first time.

8. The dual SIM mobile terminal of claim 1, wherein the controller provides a menu capable of changing a SIM if a state of the relevant network is not good when implementing a specific application with the SIM.

9. The dual SIM mobile terminal of claim 1, wherein the controller provides a menu for selecting a SIM and a menu for setting a call forward when the user roams, makes a call, or transmits a message.

10. The dual SIM mobile terminal of claim 1, wherein the controller performs a call connection to a SIM set in a group if the relevant group is set with respect to a phone number in a phonebook.

11. The dual SIM mobile terminal of claim 1, wherein the controller designates the setting of phonebook storage to a copied SIM if a phonebook of each SIM is copied to a phonebook of the mobile terminal.

12. The dual SIM mobile terminal of claim 1, wherein the controller transmits a phone number of the SIM known to the counterpart user if synchronization between dual SIM numbers is performed to make a phone call with a SIM unknown to the counterpart user.

13. The dual SIM mobile terminal of claim 1, wherein the controller receives a phone call with the primary SIM if the call forward is set, and transmits an automatic response message if the call forward is not set, when the phone call is received with the secondary SIM during phone conversation with the primary SIM.

14. The dual SIM mobile terminal of claim 1, wherein the controller displays that message transmission has been performed through a user interface (UI), and the relevant message is actually transmitted at the timing when a phone conversation is completed if the message transmission is requested with the other SIM number while performing the phone conversation using one SIM network.

15. The dual SIM mobile terminal of claim 1, wherein the controller transmits a phone call or message through a SIM number to which roaming is not set if roaming is set to the other SIM number in a network of the dual SIM.

16. The dual SIM mobile terminal of claim 1, wherein the controller controls to perform a conference call by concurrently connecting phone calls to dual SIM phone numbers and then combining the two phone calls with each other.

17. The dual SIM mobile terminal of claim 1, wherein the controller performs a call connection to a SIM number providing a reduced rate by referring to a prestored pricing table when the user makes a phone call to a specific region or specific number.

18. The dual SIM mobile terminal of claim 1, wherein the controller attempts a call connection using the primary SIM if automatic redial is set when a call using the primary SIM is failed.

19. A method of operating a dual SIM mobile terminal, the method comprising:
    detecting an active state of the dual SIM, the dual SIM including a primary SIM and a secondary SIM;
    automatically performing SIM switching according to a network state of the SIM and a user's service request if the initial user's service is requested in an active state of the dual SIM;
    performing a service requested by the user through the switched SIM; and
    performing network synchronization using neighboring cell information of each SIM network if a service requested by the user through the switched SIM is performed and then a service request for the SIM is received again.

20. The method of claim 19, wherein automatic switching is performed to the secondary SIM if a specific service is unavailable in the primary SIM when the user requests the relevant service through the primary SIM.

21. The method of claim 19, further comprising:
    providing a menu for selecting a SIM to implement a specific application if the user implements the relevant application for the first time.

22. The method of claim 19, further comprising:
    providing a menu capable of changing a SIM if a state of the relevant network is not good when implementing a specific application with the SIM.

23. The method of claim 19, further comprising:
    providing a menu for selecting a SIM and a menu for setting a call forward when the user roams, makes a call, or transmits a message.

24. The method of claim 19, wherein the SIM switching step performs a call connection to a SIM set in a group if the relevant group is set with respect to a phone number in a phonebook when the user makes a call with one phone number.

25. The method of claim 19, wherein the SIM switching step designates the setting of phonebook storage to a copied SIM if a phonebook of each SIM is copied to a phonebook of the mobile terminal.

26. The method of claim 19, wherein the SIM switching step transmits a phone number of the SIM known to the counterpart user if synchronization between dual SIM numbers is performed to make a phone call with a SIM unknown to the counterpart user.

27. The method of claim 19, wherein the SIM switching step comprises:
    checking whether or not call forward is set if a phone call is received during phone conversation with the selected SIM; and
    receiving the phone call with the selected SIM if the call forward is set, and transmitting an automatic response message if the call forward is not set.

28. The method of claim 19, wherein the SIM switching step comprises:
    receiving a transmission request for a specific message from the secondary SIM during phone conversation with the primary SIM;
    displaying message transmission complete through a user interface (UI) and storing the relevant message into the outbox according to the message transmission request; and
    transmitting the message stored in the outbox if the phone conversation with the primary SIM is completed.

29. The method of claim 19, wherein the SIM switching step transmits a phone call or message through a SIM number to which roaming is not set if roaming is set to the other SIM number in a network of the dual SIM.

30. The method of claim 19, wherein the SIM switching step controls to perform a conference call by concurrently connecting phone calls to dual SIM phone numbers and then combining the two phone calls with each other.

31. The method of claim 19, wherein the SIM switching step performs a call connection to a SIM number providing a reduced rate by referring to a prestored pricing table when the user makes a phone call to a specific region or specific number.

32. The method of claim 19, wherein the SIM switching step attempts a call connection using the primary SIM if automatic redial is set when a call using the primary SIM is failed.

33. The method of claim 19, wherein the service request for the SIM again comprises a service request between same SIMs and a service request between heterogeneous SIMs.

34. The method of claim 19, wherein said performing network synchronization searches network synchronization using the stored neighboring cell information of a secondary SIM network if a phone call is initiated to the secondary SIM network subsequent to making a phone call to a primary SIM network in a stop state.

35. The method of claim 19, wherein said performing network synchronization searches network synchronization using the stored neighboring cell information and band information of a secondary SIM network if a phone call is initiated to the secondary SIM network subsequent to making a phone call to a primary SIM network in a moving state.

* * * * *